(12) United States Patent
Yokoe

(10) Patent No.: US 7,523,080 B1
(45) Date of Patent: Apr. 21, 2009

(54) SELF ORGANIZING MODEL FOR ARTIFICIAL LIFE

(75) Inventor: Motoshi Yokoe, Los Angeles, CA (US)

(73) Assignee: Zax Corporation, Los Angeles, CA (US)

(*) Notice: Subject to any disclaimer, the term of this patent is extended or adjusted under 35 U.S.C. 154(b) by 0 days.

(21) Appl. No.: 11/262,430

(22) Filed: Oct. 28, 2005

(51) Int. Cl.
*G06E 1/00* (2006.01)
*G06E 3/00* (2006.01)
*G06F 15/18* (2006.01)
*G06G 7/00* (2006.01)

(52) U.S. Cl. ......................................... 706/16; 706/12
(58) Field of Classification Search .................. 706/25, 706/12, 14, 45, 47, 15, 20; 700/251, 253; 395/22; 295/21
See application file for complete search history.

(56) References Cited

U.S. PATENT DOCUMENTS 5,136,687 A * 8/1992 Edelman et al. ................ 706/20
5,825,981 A * 10/1998 Matsuda ..................... 700/248
6,172,941 B1 * 1/2001 Bieramperl ................... 368/10

* cited by examiner

*Primary Examiner*—David R Vincent
*Assistant Examiner*—Kalpana Bharadwaj
(74) *Attorney, Agent, or Firm*—Venable LLP; Stefan J. Kirchanski

(57) ABSTRACT

A new architecture overcomes the limitation of conventional robotic technologies. Named the Self Organizing Model ("SOM") it includes a method that allows systems to learn, grow and continually evolve without outside control. This technology enables Artificial Life, one aspect of which is robotic "life." If this system is compared to a real living thing, the hardware is like the body and the potential instinct and habits and related data are like the DNA. The hardware includes memory which contains the instinct and related data. Algorithms and organizations are provided so that the hardware forms an adapting and evolving brain that senses the environment and formulates actions to improve the survival of the Artificial Life according to predetermined rules. The organism can learn and become more complex all without complex software programs that attempt to anticipate all possible situations.

16 Claims, 26 Drawing Sheets

| Pointer to Next Action or Sensed for the Causal Relationship NEXT | Pointer to Next Action or Sensed for the Causal Relationship BEFORE | Pointer of the Related Phenomena. NEXT (5Bytes) | Pointer of the Related Phenomena. BEFORE (5Bytes) | Pointer of Form Group. NEXT (5Bytes) | Pointer of Form Group. BEFORE (5Bytes) | Pointer to the IFS. (5Bytes) | Pointer to the ISA (Comfortable or Uncomfortable or Sense). (5Bytes) | The IFS Correction Value. (2Bytes) | The Estimate Value of the IFS change after execution. (2Bytes) | Connective Intensive. (2Bytes) | Connective Frequency. (2Bytes) | Number of the RCB counts. (2Bytes) | The RCB block. This is shorted by (X1,Y1) (nBytes) |
|---|---|---|---|---|---|---|---|---|---|---|---|---|---|

The Geometric Connection Block (GMCB). Total 50+n Bytes

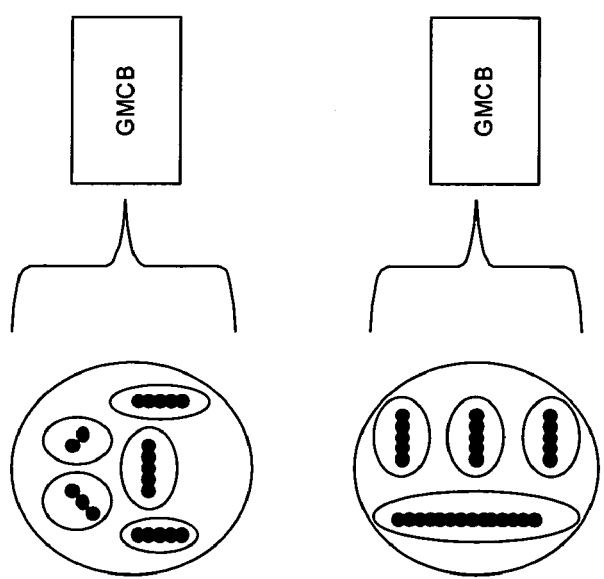

Fig. 24

| Command List |||||
|---|---|---|---|---|
| No | Command (Types GMCB) || | Direction |
| 1 | DLC | 01h | Data link connection reqest | S |
| 2 | DLD | 02h | Data link disconnection reqest | S/R |
| 3 | DAT | 03h | Data | S |
| 2 | ACK | 02h | Acknowledge | R |
| 3 | NAK | 03h | Non acknowledge | R |

| Command List |||||
|---|---|---|---|---|
| No | Command (Types IFS) || | Direction |
| 1 | DAT | 10h | Data | S/R |

S:Send, R:Receive

| |
|---|
| Types 00h:IFS 01h:GMCB (1 Byte) |
| Command. (1 Byte) |
| Transfer Is. 00h:First Data 01h:Next Data (1Byte) |
| Body ID. (4Bytes) |
| Data Size. (2 Bytes) |
| Unknown (Don't care) (7 Bytes) |
| Data. (Data Size Bytes) |

Data Transfer Packet (DTP).
Total 16 × n = Max 16 + 64K Bytes
Data Format
Types 00h:IFS

| |
|---|
| Number of the IFS Comfortable (4Bytes) |
| Number of the IFS Uncomfortable (4Bytes) |
| GMCB DATA |

Types 01h:GMCB

| |
|---|
| GMCB DATA |

Fig. 26

SELF ORGANIZING MODEL FOR ARTIFICIAL LIFE

BACKGROUND OF THE INVENTION

1. Area of the Art

The present application is in the area of machine intelligence and more specifically in the area of artificial analogs to organic life.

2. Description of Related Art

It is said that the size of the world robotic industry today is around $8 Billion. In Japan, which manufactures more than 50% of the current robots, people expect and dream of a tremendous growth with the personal robots like AIBO® (trademark of the SONY Corporation for personal entertainment robots) and ASIMO™ (pending trademark of the HONDA Corporation for humanoid robots) leading the way. According to forecasts, due to the contribution of robots for personal use, Japanese robotic market will grow to $5.4 Billion in 2005, $17.1 Billion in 2010 and $60 Billion in 2025. Further, it has been predicted that in the year 2040 there will be at least one robot per average family. Yet, the size of the market for such personal robots with intelligence is less than 1% of the total robot market. Ultimately, the robotics industry will be as large as the electronics industry or the automobile industry is today. However, the objective viewpoint holds that those dreams may not come true unless the industry dramatically accelerates development of its robotic technology. Needless to say current digital and analog technologies based on the technology of a Neumann type computer, even with a revised Artificial Intelligence (AI) or neural network the computer is simply inadequate. The robots that people are dreaming of require hardware that includes CPUs that are hundreds of times faster, data communication speeds that are thousands of times faster and memories that are tens of thousand times larger than are available from current technology. In addition, such hardware must be in small packages at affordable prices to make household robots that many people will actually want to have in their homes. Thus, there are high hurdles both technologically and economically that must be overcome. Conventional technologies such as Artificial Intelligence (AI) are unable to surmount these hurdles. AI requires huge memories to store innumerable responses prepared in advance, very fast communication and processing speed to compare such tremendous number of responses with huge volume of constantly incoming information from various sensors and to determine quickly the correct response used to decide the next movement of the robot. With conventional technologies, robots might not work at all in unknown or unpredictable environments.

It is believed that neural network systems can be used to simulate and explain many of the response properties of living organisms. Thus, neural network analogs are considered central in biology. The inventor has studied many neural network systems with an eye to solving the problems of robotics. Current medical science has used neural network solutions to model living body functions. Mechanical functions, language, vision, and other biological functions are amenable to neural network simulations and solutions. Yet, current neural network solutions do not seem to provide the self-organization function—that is growth and reproduction—typical of biological systems. Yet, it should be possible to model the growth, evolution and communication that characterize living systems. The present invention is the outcome of the inventor's efforts to do just that.

SUMMARY OF THE INVENTION

The inventor has developed a new architecture to overcome the limitation of conventional technologies. The new architecture is named Self Organizing Model ("SOM"). SOM includes a method that allows systems to learn, grow and continually evolve without outside control. While SOM is unlike conventional technologies such as Artificial Intelligence (AI), SOM is able to achieve and exceed many of the goals of these technologies. Robots based on SOM can have the ability to express will and emotion—characteristics normally though to be possessed by humans and other higher animals. These abilities will allow SOM devices to truly communicate with humans. If some current computer technologies can be called Artificial Intelligence, then SOM can be called Artificial Life—AL. Through SOM truly intelligent robots can be developed.

From this research leading to SOM one may perhaps understand the origin of the human "sixth sense" and perhaps understand the basis of the seemingly miraculous survival abilities and the natural healing energy possessed by humans. Although everyone has these survival abilities and healing energy, this has not yet been appreciated or understood by medical science. The inventor believes that in the future use of these abilities will become common knowledge. Further, there are aspects of this human system that are common to all living things. SOM technology carries this to Artificial Life (AL), one aspect of which is robotic "life." The inventor hopes and expects that the SOM technology will serve as an ultimate neural network system that will remain in the pioneering history of this new field as the core technology forming the foundation for Artificial Life in the United States.

About the self-organization of artificial living things: Artificial living things realized through SOM technology need to be prepared beforehand with potential instinct and habit (the "Life Code") and function of the foundations (the "Body") when born (the "Manufacturing Stage"). This is required for achieving the Ultimate Cause. That is, to realize an advanced living thing, and to extend potential action, it is necessary to prepare the intentional habit and the intentional knowledge (the "Instincts") within the Life Code. If this AL system is compared to a real living thing, the hardware is like the body and the potential instinct and habits and related data (Life Code) are like the DNA.

Before explaining the Body and the Life Code, it is first necessary to explain the Concept of Self-Organizing which is central to SOM. Essentially, a method or algorithm is provided to perform and effectuate each Organ of the SOM Body (see FIG. 1). The various functions are given names suggestive of processes within a living organism to emphasize the relationship between SOM "artificial life" and actual organic life. Self organization is the process wherein the SOM organism learns, adapts and evolves without direction from humans.

Memory: In the SOM organism the Memory acts to enhance instinct for survival. When as a result of taking a particular action, instinct for survival is determined to have decreased, the Instincts Arbiter inhibits that action, and if the given action is new experience, commits it to memory. Of course, any new discovery which results in increased instinct for survival is promoted and also memorized. When the same result occurs daily, memory will be optimized by the Instincts and the Subconscious. But when the experience is rarely repeated, it will be deleted from Memory and "forgotten"

through a Natural Selection process and circulation of daily generated new memories. If a SOM organism imagines the information in memory so that the information takes a form, the memory of the SOM organism can be analogized to a three dimension space in which two or more pyramids (i.e., imagined forms) are linked as a chain. The Neuro-Matrix is the unit that visualizes the pyramid in memory. Combining this pyramid (the Neuro-Matrix) chain freely or optimizing this pyramid chain is the means by which evolution and growth are enabled. To perform hierarchical growth arising from experience, the neural network must be transposed to the Geometric Connection (GMC). In addition, "Vision", "Hear", "Predation", "Tactile Sense", etc. can apply their memories to all Receptive Organs and Effect Organs. That is, the GMC of the Receptive Organ and the Effect Organ are linked together. The idea of linking "the organ that processes the information" and "the organ that uses the Effect Organ" to body control is realized for the first time here, and all functions and data become abstractions.

Circulation and Infinity Nexus: The Sensory Organ receives information from the external world and, sends this information as impulses to the Receptive Organ by means of a Neural Network. Then, the Receptive Organ obtains its GMC and controls the Effect Organ by means of the Survival and Instincts Arbiter. The Instincts information is defined by the Memory and handled as a GMC. The result of actions by the Effect Organ is perceived by the Sensory Organ, and the Survival and Instincts Arbiter is affected recursively. The result of this recursive action alters the Instinct. Furthermore, re-connection of the GMC is repeated until the connection that most closely approaches a Comfortable result is made. The Instincts create a new GMC that most closely approaches "Comfortable," which is the state the organism seeks. This searching for the Comfortable involves the Conscious or the Subconscious, and the Memory is revised accordingly.

The memory of the SOM organism is an associative memory connected with the Instincts, the Effect Organ (Output), and other Related Phenomena which are collections of Causal Relationships.

Causal Relationship: An important concept of SOM is that the action to be next executed is first sensed and then expressed. The Sensory Organ and the Receptive Organ (Input) become the ignition points that stimulate remembering. The associative memory is circulated by the reorganization and fusion of the Instincts. From this process, experiential learning is performed and growth occurs, much as in the organic life, ranging from the small living things such as microbes to insects and also to mammals such as humans. This constitutes the Infinity Nexus that achieves evolution and growth in organic life. People often consider these concepts in terms of philosophy or religion. But SOM implements these concepts through engineering technology that transposes the GMC and information to the Causal Relationship.

The Body: To realize the Life Code a combination that consists of the mechanical parts, electronic circuits and sensors is required. A large range of different sensors are possible but in most cases sensors for "Vision", "Hearing", and "Tactile Sensing" are basic requirements. The Life Code defines status as either Comfortable or Uncomfortable based on sensed information. It is good if there are many sensors because this contributes to growth of susceptibility. If a mechanical portion is controlled electronically and if a real living organism is interfaced electronically, then the mechanical portion will effectively be transposed to the body of the real living thing. The theory of SOM may be applied to a real living thing; for example by altering a nerve cell of the real living thing by biotechnology to have specific characteristics. The mechanical and electronic structures are unnecessary if modified organic life is used.

The Organs: The Organs are fixed processes for controlling the Body or the Infinity Nexus. The Organs are implemented by the electronic circuits or combinations of mechanical devices and circuits or even by actual living organisms (or parts thereof).

Sensory Organs: The Receptive Cell (RC) (that is, the Sensory units forming a Vision Organ, a Tactile Sense: Organ, an Auditory Organ, etc.) captures information from the external world and creates an information pattern on the Receptive Field (RF). The RF then generates a Receptive Cell Impulse (RCI).

Receptive Organ: The Receptive Organ creates a new GMC from the captured information expressed as an RCI. The new GMC is stored in a buffer as short term memory. The Potentially Memory Field (PMF) receives the new GMC, and the PMF performs Natural Selection of the GMC against related GMCs in Memory. The Environmental Adaptation Memory Field (EMF) then receives the GMC from the PMF. Natural Selection is again performed here for related GMCs. The result is kept as short term memory in the Receptive Organ.

The INTRON:

The "primitive" mind of an AL SOM organism is the INTRON (INTegrated artificial life organism according to the Rule Of Nexus-3). It contains the following components.

Instinct for Survival: The Instinct for Survival (IFS) manages the body's condition. The condition is a grade of Comfortable or Uncomfortable with the lowest grade of Uncomfortable being death. All the Organs are involved. If this is likened to a human, the interaction of the Organs may be likened to the sympathetic and the parasympathetic nervous systems.

Instincts Arbiter: The Instinct Arbiter (ISA) controls the performance of future actions through excitation (promoted) or inhibition (inhibited). At a given time all arbitration is derived from the situation of the IFS, and an action is promoted or inhibited accordingly. Any Causal Relationship of the INS must be construed as Comfortable or Uncomfortable. Comfortable is an action that results in a state of Comfortable. Uncomfortable is an action that results in a state of Uncomfortable. Comfortable and Uncomfortable" exist for each basic action for the SOM organism to live.

Each basic action is defined by the Life Code as follows:

Comfortable=(1) Predation, (2) Preservation of self, and (3) Recovery from damage.

Uncomfortable=(1) Becoming damaged, (2) Becoming hungry, and (3)

Becoming fatigued.

These actions are arranged in order of the priority. These basic actions form Instincts of the Primitive Neuro Matrix and the Advanced Neuro Matrix.

Instincts (INS):

Causal Relationship: The Receptive Organ captures (i.e., senses) information (forming a GMC), and this GMC becomes connected to the Effect Organ and ISA. It is thus determined whether the sensed information is Comfortable or Uncomfortable, and a Causal Relationship is formed. The INS is a place that realizes the goal of growth and evolution. Therefore, subdivision of the Causal Relationship activates growth and evolution. The Body subdivides as much as possible, and this is defined in the INS. However, advanced movements such as acrobatics are not defined in the INS.

A Causal Relationship must be connected according to the following order: (A) Sensed→"(B) Action→(C) Next Sensed.

Execution Phase: If the Receptive Organ captures information, the Effect Organ executes an action according to the Causal Relationship of the information with the INS. The process that is controlling the actual motion in the Effect Organ can be likened to a computer. That is, the INS will serve to send a command to the central processing unit in response to which the Effect Organ moves a motor.

Evolution Phase: The new GMC currently kept in the short term memory by the Receptive Organ is taken into the INS by the INS. The INS then creates a new Geometric Connection that connects all the similar Related Phenomena that are present in the Effect Organ. These are stored there as the long term memory. However if the new GMC can't be connected to Related Phenomena, it is connected into the Primitive Neuro Matrix.

Natural Selection: Furthermore, Natural Selection is performed here for related GMCs like in the PMF.

Primitive Neuro Matrix (PMX) is like the subconscious:

Recursive Connection Phase: Re-connection of the GMCs is made to enable rapid action. However, if the result of the Execution Phase exceeds the capacity of the Effect Organ, an Uncomfortable result will be generated by the Receptive Organ to protect the Body. This will become an Uncomfortable memory and a new Causal Relationship within the INS. But if Execution Phase succeeds in a rapid action within the capacity of the Effect Organ, this will become a memory of a Comfortable result. If this is greater than the Comfortable level of the existing Causal Relationships of the INS, it will be added as a new higher priority to the Causal Relationship of the INS.

Trial and Error and Fusion Phase: An incomplete GMC (one where the Causal Relationship is not complete and has not connected with Related Phenomena) may come from the INS or from other instances of AL (i.e., other organisms). This corresponds to a situation, where GMC (A) is connected with all GMC(B)s and GMC(C)s at random in the PMX. Then if there is a connection and relation that corresponds to GMC (A) in the INS, a new connection will be added to original connection of the INS. Next, if same GMC(A) as this comes from the Receptive Organ, a new Causal Relationship will be executed by the Execution Phase. As a result, the Causal Relationship of the INS reflects the instinct for survival of the IFS. If this is higher in Comfortableness than the instinct for survival of the Causal Relationship of former INS, the priority will be increased. But the priority will be lowered if the instinct is lower. Furthermore, all connections of the same Causal Relationship of (A) are re-connected in all combinations, and a new Causal Relationship is made, and circulated. The above process will be performed for GMC(A) to GMC (B) and GMC(C). Re-connection will be made to approach the Causal Relationship of the INS. And re-connection will be performed unconsciously and randomly. However if the new GMC can't connect to the Related Phenomena, it will wait for a situation allowing connection to occur. However, the new GMC it may be destroyed by the Natural Selection according to the rules of the PMX before such a situation occurs.

Natural Selection: Natural Selection is performed like in the PMF for related Causal Relationships in the Related Phenomena. The Natural Selection of the long term memory is performed during sleep (down time). A mechanism of subconscious trial and error results in Natural Selection of the INS. The result of the Natural Selection of the INS is changed into still more advanced GMCs, which are stored as long term memory in the INS.

The Advanced Neuro-Matrix (AMX) is like the conscious mind and is another arbiter:

Conscious Trial and Error: In the PMX, each GMC is abstracted and applied to the GMC of each organ. The AMX performs re-connection like that in the PMX.

Trial and Error Level 1: This is re-connection that applies to other organs and is furthermore fed back to create imagination of.action. Therefore, activity of the Effect Organ is stopped and actions are not executed. This is performed as a back ground process.

Trial and Error Level 2: This is the mechanism of the conscious trial and error. Re-connection is applied to other organs, and is furthermore fed back and realized by an action. When the situation of a margin of rest is sufficient, this will certainly be performed. Therefore, it must be performed while other organs are inactive. When this is not performed, the memory will be a condition of near overflow and, the IFS state changes to Uncomfortable. Then, the ISA gives priority to this function forcing inactivity of other organs (i.e., rest or sleep).

The Effect Organ: The Effect Organ (the Body, the mouth, the eye, the hands, the foot etc.) gives a series of movements to each moving element. A series of movements controls the moving elements completely. Therefore, the Effect Organ should prepare the performances that give full play to its ability, and the fundamental function is prepared beforehand. But, if the INTRON performs maximal motion in its immature state, it may destroy itself. Death may be brought about by motion beyond a limit. Therefore, the INTRON functions at a minimum capability when born so as not to destroy itself. The Instinct for Survival and the Instincts Arbiter are affected recursively, and naturally will become familiar with this limitation. In addition, pain may be experienced during this process. Then the experience is gained and pain is overcome. However, this motion may interfere with the Instincts Arbiter. But then interference is also overcome and motion is applied and extended by the INTRON and its ability is reinforced by growth.

About the Geometric Connection (GMC): All the information dealt with by a SOM organism is expressed through a base element of shape. The element is a line and all possible angles therefrom. In the case of the Sensory Organ, all of the image, the sound, the sense, the color, the motion, etc. are represented as collections of lines. In the case of the Effect Organ, all of the motion, the speed, the power, etc. are also internally represented by collections of lines. These line collections form sets of the same angle by making line length into a measure of intensity. This can be connected with the straight lines of other angles to constitute a Geometric Connection. The IFS and ISA of the INTRON both express a condition. The GMC may be revised accordingly. Therefore, all GMC's are observing the IFS and the ISA.

The Life Code: The Life Code is an element absolutely required, for survival after the AL is bom. Yet, Life Code is not a computer program per se. It is like basic instructions for correspondence to generated phenomenon. A Life Code exists for each Organ. Then, the AMX or the PMX extends All the Related Phenomena and the organism grows up.

Thus each AL organism exhibits the following: (1)—Receptive Organ; (2)—Instinct for Survival (IFS); (3)—Instincts Arbiter (ISA); (4)—The Instincts (INS) (including the Related Phenomena); and (5)—Effect Organ.

The Receptive Organ is made so that each receptor will respond to a high level (e.g., for the Vision Organ a bright light will cause a distinct response such as inducing automatic focus, if applicable).

The IFS protects the body. Bodily functional disorder and damage are perceived as pain and consumption of energy is perceived as hunger. These are defined as Uncomfortable with death defined as the ultimate Uncomfortable. As a result an action is taken to reduce pain and hunger with the hope that the situation becomes more Comfortable. These definitions are important elements that determine bodily composition and the character of the AL organism.

Through the ISA, the Effect Organ is controlled so that Uncomfortable can be avoided. But "Avoids" or "Wishes" is selected by the ISA being affected recursively. All the Causal Relationships of the INS must be connected with Comfortable or Uncomfortable. Comfortable is an act that becomes Comfortable as a result of action. Uncomfortable is an act that becomes Uncomfortable as a result of action. Comfortable and Uncomfortable exist for each basic action. Therefore, many actions can be considered as follows in order of decreasing Comfortableness or Uncomfortableness.

Comfortable: #1 Predation>#2 Preservation of self>#3 Recovery from breakage.

Uncomfortable: #1 Becoming broken>#2 Becoming hungry>#3 Becoming fatigued.

It is necessary to consider each basic action of the INS, the PMX, and the AMX in view of the above. Furthermore, it is necessary to construct the INS, the PMX, and the AMX to respond similarly to each basic action.

Instincts (INS) (and Related Phenomena): The INS determines which motion of the Effect Organ should be performed in response to information from the Receptive Organ. That is, it provides an output according to an input. The Causal Relationship must be connected in the following order.

(A) Sensed"→"(B) Action"→"(C) Next Sensed. That is, a sensory input (A) and the resulting action (B) for a location P where P=(A,B). This location is linked by way of (C) to related locations forming a causal relationship. Thus, P is linked to P1, P2, P3, . . . Pn. The linked locations can be visualized as {P1,1, P1,2 P1,3 . . . P1,n}
{P2,1, P2,2, P2,3 . . . P2,n}
{P3,1, P3,2, P3,3, . . . . P3,n} etc., etc.

As for the definition of the motion to connect, whatever leads to Comfortable is the deciding factor. (e.g., when a thing is seen by an organism, it touches the thing, holds it, puts it into its mouth, and swallows it, etc.). And if the hunger condition is alleviated by this chain of actions, the organism becomes Comfortable. But when the taste is bad or the thing gets stuck in the throat, the condition will change to Uncomfortable. But then once again, another Comfortable action is taken. And these steps are repeated. Such a Causal Relationship is defined here. However, the Causal Relationship so defined is very primitive. The advanced motion is not defined at the time of birth (i.e., when the AL organism first comes into being). It will be appreciated that these examples describe behaviors appropriate to organic life. Although the general behaviors are also appropriate to Artificial Life, they should necessarily be adjusted according to the physical characteristics of the particular artificial life. Placing something in ones mouth is an appropriate behavior for organic life looking for food. If the Artificial Life is powered by electricity, then electric power is the food and the Artificial Life trying to overcome hunger (low batteries) would test its surrounding looking for sources of appropriate electrical energy. In analogy to organic life, if a source of electricity is found but the source is at an inappropriate voltage or frequency, it would "taste bad."

The Effect Organ (Series of movements): The Effect Organ defines the control method of each moving element, all realization of the ability given to the body as explained above.

By preparing beforehand all the functions explained above, Artificial Life can "grow up" to more advanced functions. Therefore, "the bodily function" and "the character" and "Does it grows up toward a target?" must be decided before the particular Artificial Life is built.

Self-organization of the Artificial Life Group: An Artificial Life organism gains experience and adapts to the environment. As a result, the AL organism may exhibit imagination and emotions such as hope, despair, anger and desire for growth. Communication methods and organized activity are promoted. Communications created by Artificial Life are inherited from an organized activity with other Artificial (or real) Life. As a result, the Artificial Life Group is born, each such group affects other groups and, they gain experiences and grow. Moreover, social growth of the groups affects the environment. The groups affected by the environment also gain experiences and grow. And each Artificial Life Group also gives recursively effect to Artificial Life individuals which are affected and grow. This circulation is called the Systematic Chain, and an organized growth process is realized through it. The Systematic Chain is similarly realized in the brain and all organs of an Artificial Life organism. Therefore, Artificial Life has a mechanism of growth. This self-organizing function is inherent in Artificial Life; it is not a peculiar function depending on the Artificial Life. It is the natural function included in the systems of the natural world that SOM uses and circulation of this type is an ultimate cause of life.

The theory of growth of SOM: In SOM growth is defined as follows. (1) The appearance of self-changing adaptation to the environment; (2) The internal function of self-changing adaptation to the environment; (3) The ability to unconsciously observe with interest the function and form of other Artificial Living organisms of the same kind. As a result, the society of AL organisms of the same kind is affected by it, and change of this society changes environment and promotes the former. The first two are called growth of the Artificial Life and the third is called growth of the Artificial Life Group. In order to realize these, it is necessary to prepare the capacity for each fundamental function beforehand. If the AL organism prepares and installs more advanced capabilities, it will become more adapted to its environment. The environment stirs up dormant capacity in the INTRON, and (1) and (2) are realized. Characteristics increasing the instinct for survival of an AL organism also influence the society of the AL organisms—that is, the Artificial Life Group.

The AL characteristic of observation of self applies to a mother teaching a baby (e.g., "good thing", "bad thing", "language", etc.). A child imitates its mother because the child inherently knows that instinct for survival is thereby increased. And, the most elementary communication of the AL organism is born from increasing the instinct for survival. And these change the social environment. Furthermore, it becomes a circulation that also changes the natural environment. Finally, characteristics (1) and (2) are induced by (3) and, the AL grows. Growth of the AL Group involves the same concept as growth of the AL organism ("Preparing a capacity which is dormant rather than a function to be used."). This can bring many other kinds of AL together, and they coexist in one environment together. Then, Natural Selection occurs from this point and the nexus of the life starts.

The connection and reconnection of GMCs in causal relationships is called circulation. In a SOM organism, much is determined by the designer's intentions concerning how these circulations are realized. And once this circulation starts, the Infinity Nexus that doesn't require the continued input of humans will begin. I call the beginning of this chain the "Big Bang of AL." Next, the Infinity Nexus is called the Nexus3 from the "3 definitions of growth." The raison d'etre for SOM is to be realized through Engineering Technology.

Definition of the Big Bang of AL and the Circulation.

Information Sensed and Action resulting have already been explained as forming a location P=(A,B) where the Sensed data (A) provides the X coordinate data and the Action (B) provides the Y coordinate data. This, then, provides two dimensions. Furthermore, A's of similar forms and B's of similar actions are linked together with three dimension space being constituted by arranging these linkages on the Z coordinates. This linkage has been represented in the figures as a triangular shape with the "C" point representing the Z axis data. Four dimensional space is constituted by connecting this three dimension space on a time-axis M. All B's that exist in one time-axis have a possibility of being connected with any A's of other time-axes, and also by re-connection with other time-axes as well as appearance or disappearance of time-axes of a certain kind. SOM treats four dimensional space as infinite dimensional space. If this infinite dimensional space is stabilized and continues, life activity is begins like natural law. The moment this infinite dimension space is generated, all A's and B's connect all at once. This state is called the Big Bang of life, and the state of having been stabilized, wherein reconnection occur, is called Circulation. The concept of the infinite dimension space of SOM, the application to space-time theory and the simulation of space-time theory is possible.

The theory of SOM evolution: Evolution is a concept in which something is inherited by each new generation from the previous generation's the nature through a Fusion within the INS or the PMX or the AMX. Then, the new generation is able to start growth from that point. However, nobody knows the direction of evolution. But a Fusion is performed on the Life Code of the new generation from the nature of the previous generation's Life Code. This changes each succeeding generation. The current Body may not follow the intention of the AL of the present generations. If that is so felt by instincts, that will transfer its nature to the new body that has not yet been born. If the performance of the new body is improved, higher evolution will be realized. But if the performance is inferior or the same, a different evolution results. If the differences between the previous body and the current body are great, character will also change in proportion to these differences. It is derived from instinct for survival. If the organism is made by cell computing so that increased performance of the new body is readily achieved, evolution can continue at an unimaginable rate.

The appearance of the AL organism created by SOM: The AL organism produced according to SOM is given birth when a power supply is switched on. Predation, Comfortable and similar fundamental conditions (discussed above) are all defined beforehand. Of course, a much greater number of fundamental conditions may be required. Also required are a number of sensors such as "eye," "ear" and "touch" that must be provided to collect information from the external world. In addition, "a member for grasping," "a mouth for eating" and "a member that causes locomotion" as well as similar organs are required for the body. Finally the goal of motion is prepared (huge conditioning may be required). Food and environment required for survival must be available to some extent If energy is exhausted, death occurs.

The AL organism is born: First, this AL organism grows to reach the ultimate goals (Motion, Life, etc.). This involves predation and the rest of the AL living process. From this, the organism behaves so that at the time of birth it puts anything into its mouth anything. Then it judges using a Sense Organ if the thing is food from its feel or taste. Then, the organism gets to know the varieties of food. In this way, a food library is built. That is, by use of the functions "action of eating", and "the feel and the taste" which were prepared beforehand. Next, the thing that corresponds to the library of food is seen in the environment, and the organism performs a recognizing action for the food and, puts it into the mouth. And it is judged whether the thing is food. If it is food, that is good but when it is not food, the organism doesn't eat. It moves unconsciously, simultaneously feeding back the action for approaching the final goal. Much action is experienced, and while repeating new discovery, action changes from unconscious to more conscious action. Naturally, the organism does not stop at a fixed place but keeps moving. Therefore, the location for activity is also diverse and the meal environment also changes constantly. New action is discovered from this. And the organism wanders about in quest of food.

Fundamentally, it is a repetition of these actions. But the reason for action is not only this. If "it just wanders about in quest of food" as expressed above the organism will be at the microbe level. However, if one adds the concept "Comfortable" here, the character of the AL organism changes suddenly and the progressive effect is brought to activity of the AL organism. That is, the AL organism which moves unconsciously in the beginning also experiences "is painful if the body breaks" in the moving process. This is experienced through a defensive instinct that results in a concept of "settlement." If food is abundant, the AL organism avoids the risk of breakdown. This results in the situation of "raising instinct for survival". But, if food is not abundant, avoiding settlement results in "raising instinct for survival". This concept is set into the AMX and, settlement is born as a concept. Of course, the reason for conceptual birth of settlement is not only this. Actions of similar other AL organisms are imitated. If this results in a connection which "raises instinct for survival", the new concept is thus created. Furthermore, systematic hunting will be performed if useful for capture of food. Primitive communication is born from these overall actions. Furthermore, give the concept called "Affection" to the AL organism then and modernistic communication will also be born. SOM determines the direction of many concepts, and the resulting abstract information is shared and used by many organs. This shared and used method is given to the AL organism as a new concept called imagination in the SOM. From here, many experiences occur, and the organism grows up.

The Fundamental Meaning of "Predation".

On one hand Predation is the prevention of death so as to become comfortable. So Predation would mean satisfaction of hunger as when a predator consumes its prey. But does AL prey on organic life? This can cause an inconsistency to arise. When an organic life form moves, the AL organism judges the situation which the organic life will have following predation (e.g., because the AL organism has a presentiment of the existence of a life that it shares with organic life). Predation of the organic life results in death of that life. Death of the organic life is likened to death of itself. Whereupon, a paradox arises in the AL organism's IFS, and predation may be stopped. Yet if the paradox is generated and all predation is stopped, the AL organism will die. This is contradictory to the instinct for survival. However, this inconsistency serves as an element very important for experiential study, communication, or new discovery. The place that realizes this element is the ISA, and the foundation of that element is the IFS. The AL organism gets an answer from this inconsistency. Furthermore, the flow that gets the answer is one of circulation. AL organism from there will grow and also will be evolution.

Humanness: Differences in the body and instinct are defined beforehand. On a human level, the following characteristics are given to the male and female.

The Male: #1. Body is firm; #2. Body is powerful; #3. Desire for preservation of self to the female.

The Female: #1. Body functions to bear a child; because this is a very complicated function, the #1 and #2 male functions are also concentrated on the function of child bearing; #2. Desire for preservation of self to the male.

After giving these characteristics, the difference in character that appears in the female versus the male is as follows.

The Male: #1. Although the male can be violent there is a tendency to protect the female from other males; #2. The level of wisdom is lower than female, but, physical strength compensates for the lack of wisdom; it has the strong point of protecting a weak person.

The Female: #1. Made precisely for functional protection of offspring; the level of wisdom is higher than the male and weakness is protected by the wisdom; #2.

Defense instinct raises susceptibility to the maximum; therefore, feeling or wisdom is generated from the defense instincts in the instinct for survival in many cases.

Differences due to the above characteristics appear in the difference in the body and in the instincts. Power is powerless before wisdom. Wisdom is the super weapon and is the tool that makes the future. It is from the female wisdom that the human is born. Each other coexisting relationship is maintained in the balance between power (the Male) and wisdom (the Female). However, this is a part of explanation. The result of this led from the theory of the SOM.

The possible applications of the SOM invention are essentially unlimited because the abilities and functions of AL like organic life are virtually limitless. A few of the typical applications are:

Super environmental robot: These are robots able to work independently in extreme environments where humans are not able to work or even to control robots remotely, as in space, deep sea, and deep within of the earth. These robots should contribute to lowering the cost to develop such areas. For example, in space, one can launch such robots along with a satellite or launch them separately to reach the satellite where they can repair, update and otherwise make the satellite's useful life much longer. If such robots are armed, they can be used to provide a military presence in space. Certainly, such robots can be used to terra form other planets. When the robots have terra formed a planet, the environment of the planet may become adapted to its robots, much like the way the environment of the earth is affected by the living organisms thereon. It will be appreciated that each of these tasks requires operation in an environment where many aspects are unknown. Thus, it is not possible to design and program a robot to deal with all contingencies. However AL constructed according to the methods of SOM is prepared with instincts and body structures reflective of the best guess concerning the anticipated environment. Once in place the AL can learn, adapt and evolve to deal with the environment and task at hand.

Defensive robot: Instead of launching a number of million dollar missiles that might at times miss the targets, it will be possible to launch a large number of defensive robots for the cost of a single missile. Such robots will be able to communicate with each other to find the best way to reach a target. Then the robots can surround an enemy and demand a choice of surrender or destruction. With conventional technology like AI, these kinds of robots would each require a huge super computer. With SOM technology the robots can have a small size. Needless to say, depending on the target, the robots can be given the ability to fly or dive as needed.

Personal robots: With SOM the current road map of the robotic industry can be achieved as planned or even faster because SOM will reduce the cost of personal robots dramatically and contribute their explosive popularization. In addition, the abilities of SOM technology to enable robots to express will and emotions will upgrade them from an expensive toy, to an indispensable partner for humans. These robots won't be only for entertaining people. Some robots may be help care for or cure patients that are mentally ill, depressed or autistic by allowing them to open their minds to the robots rather than forcing them to open their minds to other people.

Visual recognition system: SOM technology will be an enormous contribution to the medical and the security fields that are struggling in developing vision recognition systems to judge foci (of cancer) or to recognize faces (of terrorists).

Automobile driving system: Finally, vehicles will have vision and sound sensors to keep an appropriate distance from objects in front, rear and on side allowing them safely to carry sleeping passengers to remote destinations.

Super cell computer: SOM technology enables the data and processes of super cell computers to be distributed. Therefore, destruction of such computer brains is difficult. Even if the body is destroyed, the brain may be safe. And brains will look for a new body and the body is reproduced after the new body is found. Furthermore, it's possible, by using SOM, to improve ability and speed of super-computers dramatically. This will be used for disaster prediction, warning systems for earthquake and tsunami, and also other applications considered impossible now.

Unique Business Model Enabled by SOM (The Knowledge Provider)

As a result of the progress of information technology and robotic technology, the independent robot market is about to grow explosively throughout the world. However it's still struggling and remaining relatively limited. This is mostly because of the great cost and the size of robotic instrument or machines ("Robots") that are able to contain the intelligence and/or knowledge that defines the character, uniqueness and potential of Robots ("Knowledge") with the electronic devices to support such functions. This business model shall make an enormous contribution to the industry in lowering the cost decisively and increasing the home usage of robots explosively.

It is the present business model for a Knowledge Provider (The "Provider") to provide electronically, by means of the Internet or similar systems, Knowledge needed to use Robots to people under contract (the "Member").

Each Member will pay a small monthly member fee (e.g., ten (10) to twenty (20) dollars) to the Provider to provide and maintain the Knowledge in their servers or in the network with the technology of Cell-Computing System (the "System"). In this System the Knowledge will be maintained robustly, and almost totally protected from loss caused by any possible disaster.

The Members will take care and allow the Knowledge to grow to be able to optimize the performance of Robots as the Members desire. Through this process, a robot can grow and become an adult; the possibility of bearing a "child" may even occur. However, alone, the possibility will not be realized because a partner is certainly need like a real living thing. And the robot should certainly evolve to exceed the abilities of the current generation.

The Provider may buy CPU capacity in computers owned by Members or non-Members for a few dollars a month to create the System. This model saves investment capital for Provider and allows the Provider to sell extra CPU capacity to any interested parties.

The Provider may also be in the business of selling Robots and components including interface devices to allow communication between Robots and terminals.

The Provider will also have an opportunity to sell advertisement opportunities at the Providers web-site or other communications with the Members to interested parties like Robot or component manufacturers or merchants who desire the Members to buy their products or services.

Considering the multiple business uses described in this document, as well as other opportunities that will be obvious to one of skill in the art, the minimum number of the Members that the Provider must have could be relatively small, may-be about ten thousand (10,000).

Provider will be responsible for making best effort to prevent any illegal use of Robots by Members in technology and in manner of contract as well.

Unique features and abilities enabled by SOM can be summarized as followings:

(1) Ability to learn, grow and evolve independently in an essentially unlimited fashion.

(2) Ability to express will and emotions through independent communication.

(3) Ability to solve problems creatively.

(4) Ability to adapt to unknown environments.

(5) Ability to survive under extremely difficult conditions.

DESCRIPTION OF THE FIGURES

FIG. 24 is a diagram showing the Geometric Connection Block data table of an AL organism according to the SOM invention implemented with computer technology.

FIG. 26 shows a table representing the structure of a data packet that can be used to implement Preservation of self through Instincts and the Telepathy Terminal.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a method and structure for building Artificial Life.

Figure 1:
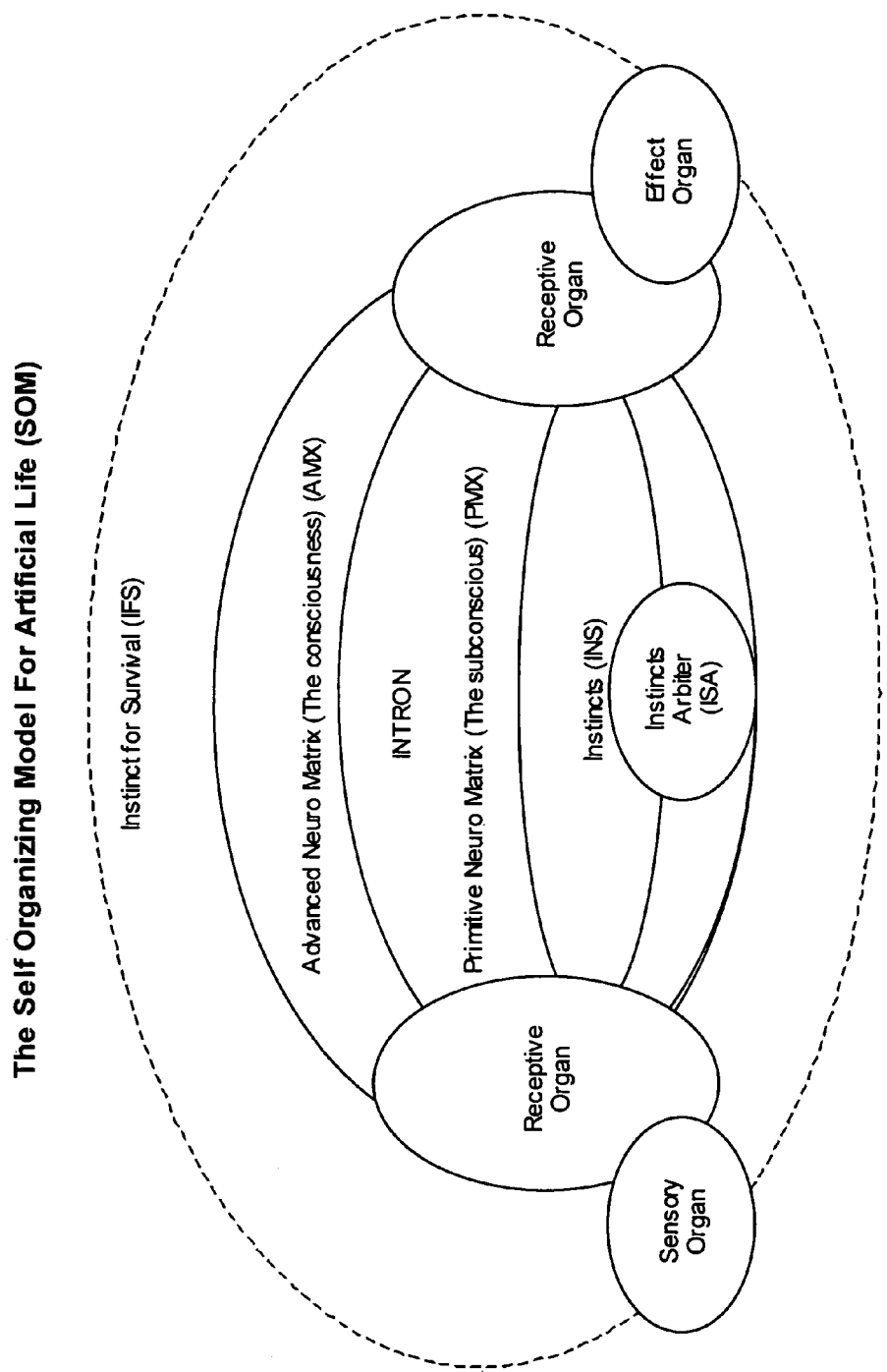
FIG. 1 is shows a diagram of Artificial Life according to the SOM invention.
Figure 2:
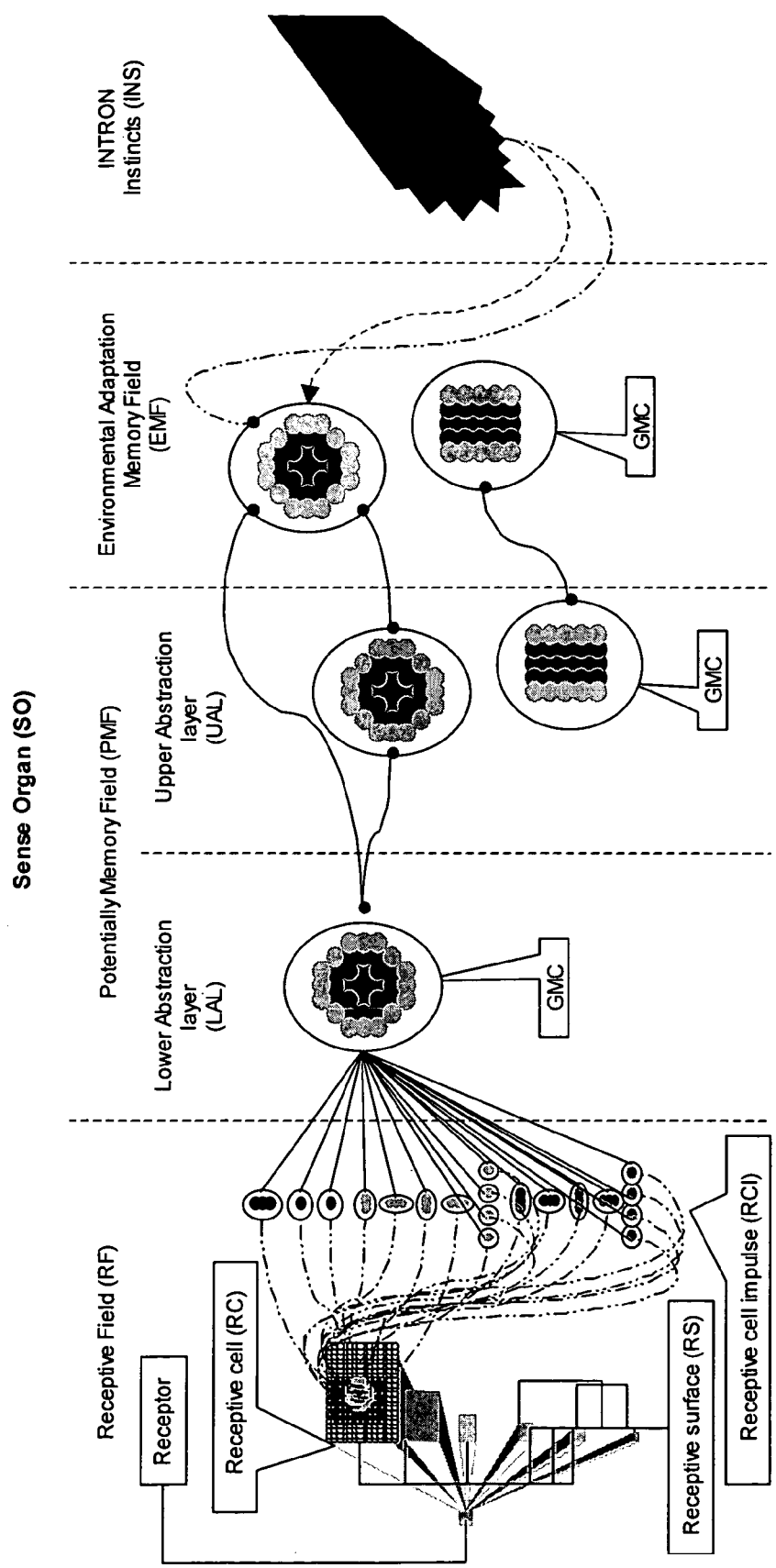
FIG. 2 is a diagram explaining the Sense Organ of an AL organism according to the SOM invention.

The Self Organizing Model For Artificial Life (SOM): SOM is described here to enable implementation by the mechanical and electronic circuits and sensors. FIG. 1 shows a diagram to show the functional relationship of the various parts of an AL organism constituted according to SOM. An outer perimeter of the organism is indicated by the region embodies by the Instinct for Survival (IFS). Inside of this is the region containing the "brain" of the organism. At the bottom is found the Instincts and the Instinct Arbiter (ISA). Above this is the Primitive Neuro Matrix (PMX) or the sub-conscious brain of the INTRON. Above this is the Advanced Neuro Matrix (AMX) or conscious brain. Note that all regions of the brain interface with two Receptor Organs. One Receptor Organ is connected to a Sensory Organ (the input for information) while the other receptive organ is connected to the Effect Organ (the output through which the organism affects the The Sensory Organ:

The Receptive Field (RF): The general functioning of the Sensory Organ can be explained in terms of a general Sense Organ illustrated in FIG. 2. The device functions by means of a receptive surface (RS) formed as a matrix of receptive cells (RC). Each RC is designed to produce a signal in response to some energy or force impinging on the RS. A great variety of different RCs are possible. For example, a piezoelectric cell can serve as a Pressure Sensor (for environmental or tactile purposes) and can also act as a pain receptor. A thermistor or thermocouple RC can provide a hot and cold receptor, etc.

The RCs are arranged in a matrix to constitute the RS. As explained below in reference to the Visual Organ, the RCs interpret the sensory input in terms of straight lines. Each individual RC responds to a stimulus by connecting to adjacent RCs to detect edges in the sensed pattern. A collection of connected RCs outputs an individual signal (receptive cell impulse or RCI) representing in the form of a line what is being sensed at that particular region on the RS. These signals can advantageously be electrical signals in which case the entire Sense Organ can be implemented electronically. However, other signaling means such as light or even mechanical connections can be employed. In any case the RS is comprised of the sensor matrix and each RC collection can be designed to respond to difference (e.g., direction or intensity) of the sensed energy or force. This is diagrammatically represented by the dotted signal lines from the individual RCIs (collections of RCs) and the small attached diagrams that graphically represent the different information as sensed by each RCI.

The individual segments of a pattern sensed by the separate RCIs are reassembled in the Lower Abstraction Level (LAL) of the potential memory field (PMF) to form a GMC (Geometric Connection). Previously sensed GMCs are temporarily stored in the Upper Abstraction Layer (UAL). In this example there are two different GMCs in the UAL, one of which is similar to the currently sensed GMC in the LAL. Because of this similarity a connection is formed between the LAL GMC and one of the UAL GMCs. The Environmental Adaptation Memory Field (EMF) stores previously sensed GMCs that have survived a selection process. Here the EMF contains GMCs similar to those in the UAL. Therefore, connections are formed between the similar GMCs. One of the EMF GMCs received two connections from the Sense Organ because it matches both the LAL and the UAL. This "favored" GMC links into the Instincts (INS) if a similar GMC resides there (Experienced Link). This reinforces the GMC within the INS and an Experimental Impulse is returned from INS to further reinforce the favored GMC. In this way commonly sensed patterns are reinforced in memory and this information finds its way into the INS to generate a response.

Figure 3:
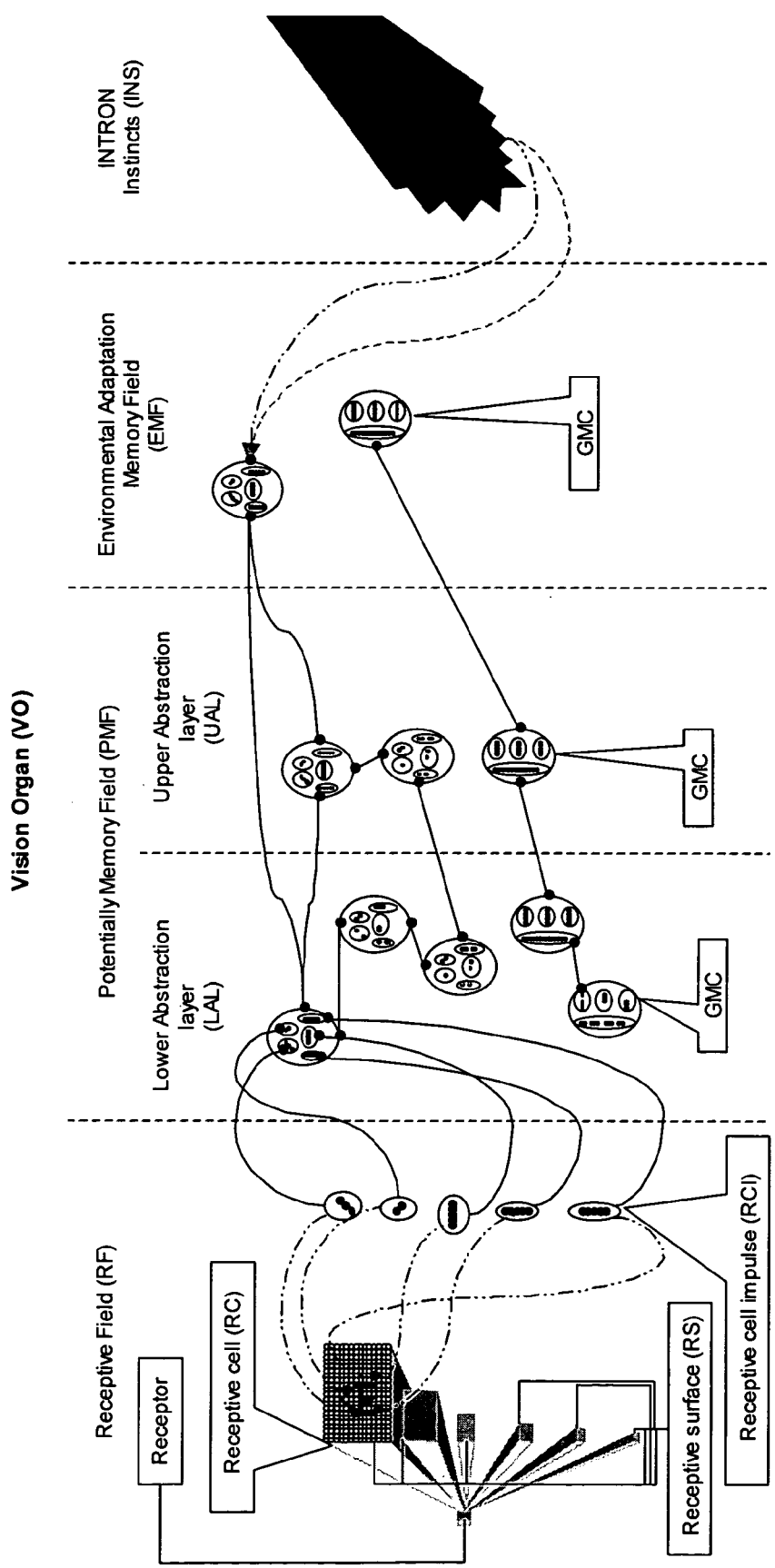
FIG. 3 is a diagram explaining the Vision Organ of an AL organism according to the SOM invention.
Figure 13:
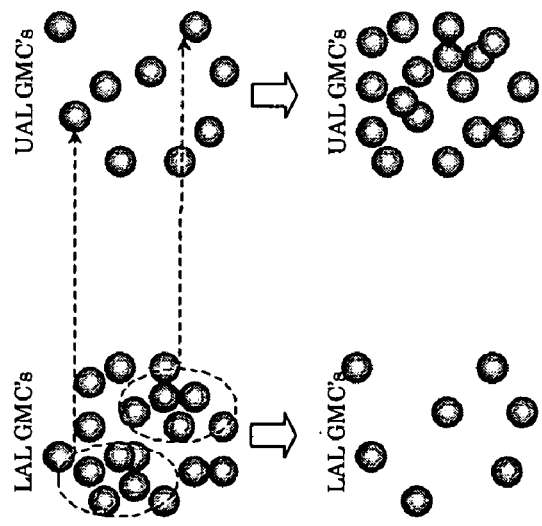
FIG. 13 is diagram showing the Environmental Adaptation Memory of an AL organism according to the SOM invention.

RF of the Visual Organ: The Sensory Organ can be further explained by the example of the Vision Organ (VO) example as shown in FIG. 3. In this figure, the RS is provided by a CCD camera. Here, the Receptive Surface (RS) responds to the stimulus received by each RC. It is important to understand how the RCs are arranged to form the matrix of the RS. The RS has RCs of six sizes, 1, ½, ¼, ⅛, 1/16, 1/32, and receives impulses from each size. Size 1 is the same as the number of elements of the prepared Receptor. Other sizes (½, ¼, ⅛, 1/16, 1/32) are smaller than that. This increases the frequency of the detection edge. That is, if the stimulus is coming from a straight line, smaller RCs enable the detection of finer detail That is almost like improving the focus of an image so that fine details can be discerned. The detection is based on straight lines and both a thick line and a thin line are expressed as one straight line. There is an RC for each pixel on the RS (Size 1). The RC detects an edge by correlation of the vertical (Up, Down) and, the horizontal (Left, Right) and, it connects with the RC that adjoins ft. At this time, the size of RS explained above increases the frequency of edge. The RC connects with adjoining RCs until it encounters the following conditions: the direction of the detected image changes; or an already connected RC is found. Thereby, the RC constitutes the minimum unit of the shape. The minimum unit of the shape is straight line and has angle (relative to the RS) and length information. A circle or any other shape can be formed by a collection of a plurality of line segments of appropriate length and angle. A collection of RCs constitutes a Receptive Cell Impulse (RCI). The RS sends the RCIs to the Potentially Memory Field (PMF) where each RCI is one element of the GMC (See FIG. 13). FIG. 13 illustrates a situation where a collection of linked GMCs are moved from the LAL of the PMF to the UAL of the PMF through the process of Natural Selection. Because the Visual Organ provides a higher level of resolution than the resulting GMCs are necessarily more detailed (FIG. 3). But the same connection and reinforcing process occurs as with the more general Sensory Organ already discussed.

Figure 4:
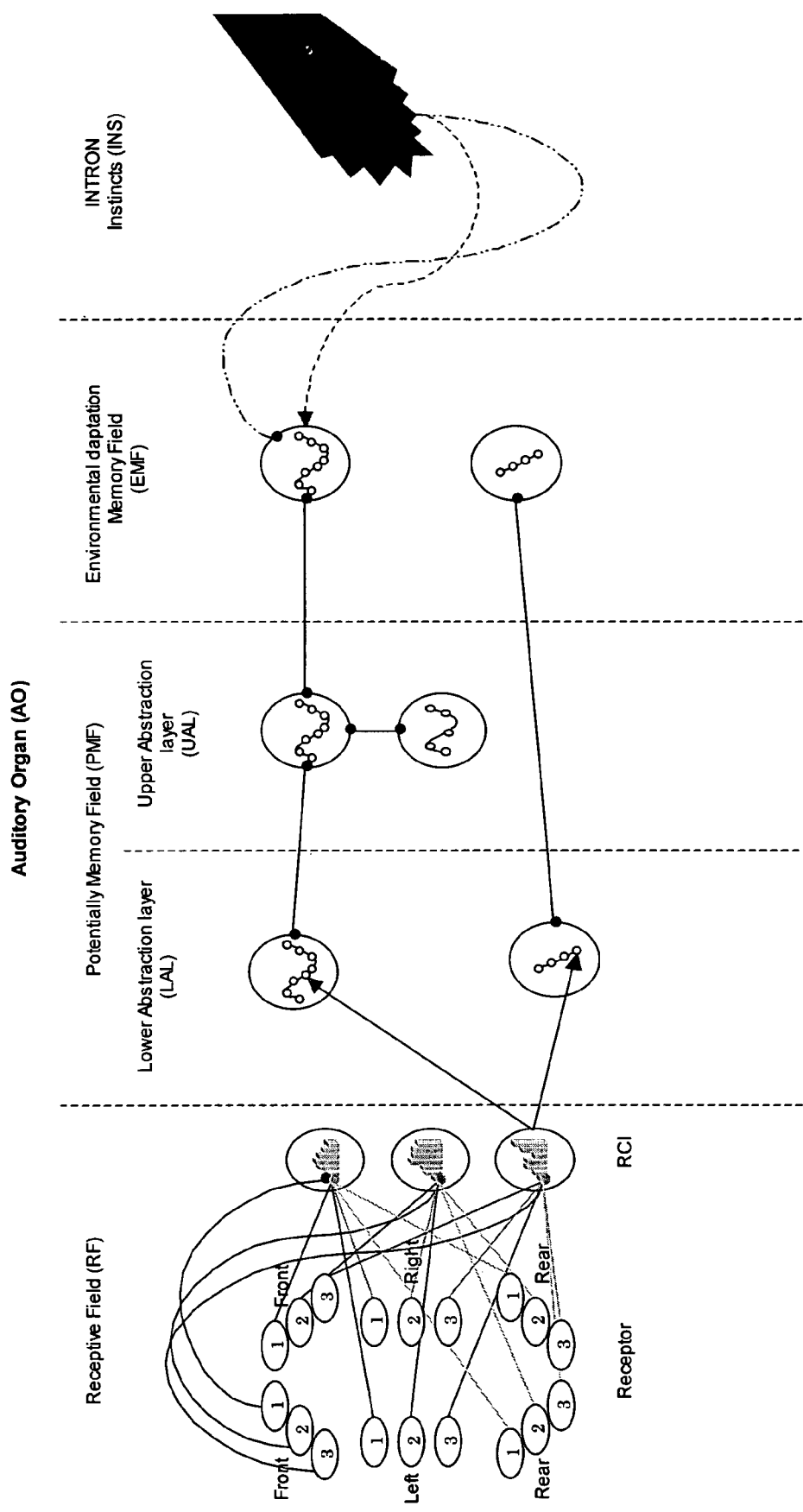
FIG. 4 is a diagram explaining the Auditory Organ of an AL organism according to the SOM invention.

RF of the Auditory Organ: The Auditory Organ (AO) is shown in FIG. 4 where a plurality of Unidirectional Microphones are arranged to receive sound inputs form the right-up, mid, and rear and left-up, mid, and rear. The sound from each microphone is separated according to frequency, and an RCI is formed. This RCI has arbitrary frequency for all elements. Frequency is also separated according to volume—for example, by intervals of 100 db. Thereby, recognition of the position by sound and recognition of only arbitrary sound are possible from change of volume and tone. Recognition of the position especially by sound plays a role similar to a gyroscope in maintaining balance. This RCI always changes serially in time. Therefore, the AO differs from the Vision Organ and The Sense Organ. The RCI is created by detecting serial changes of volume in the line The time slice width is, for example, 1/30 of a second.

Figure 5:
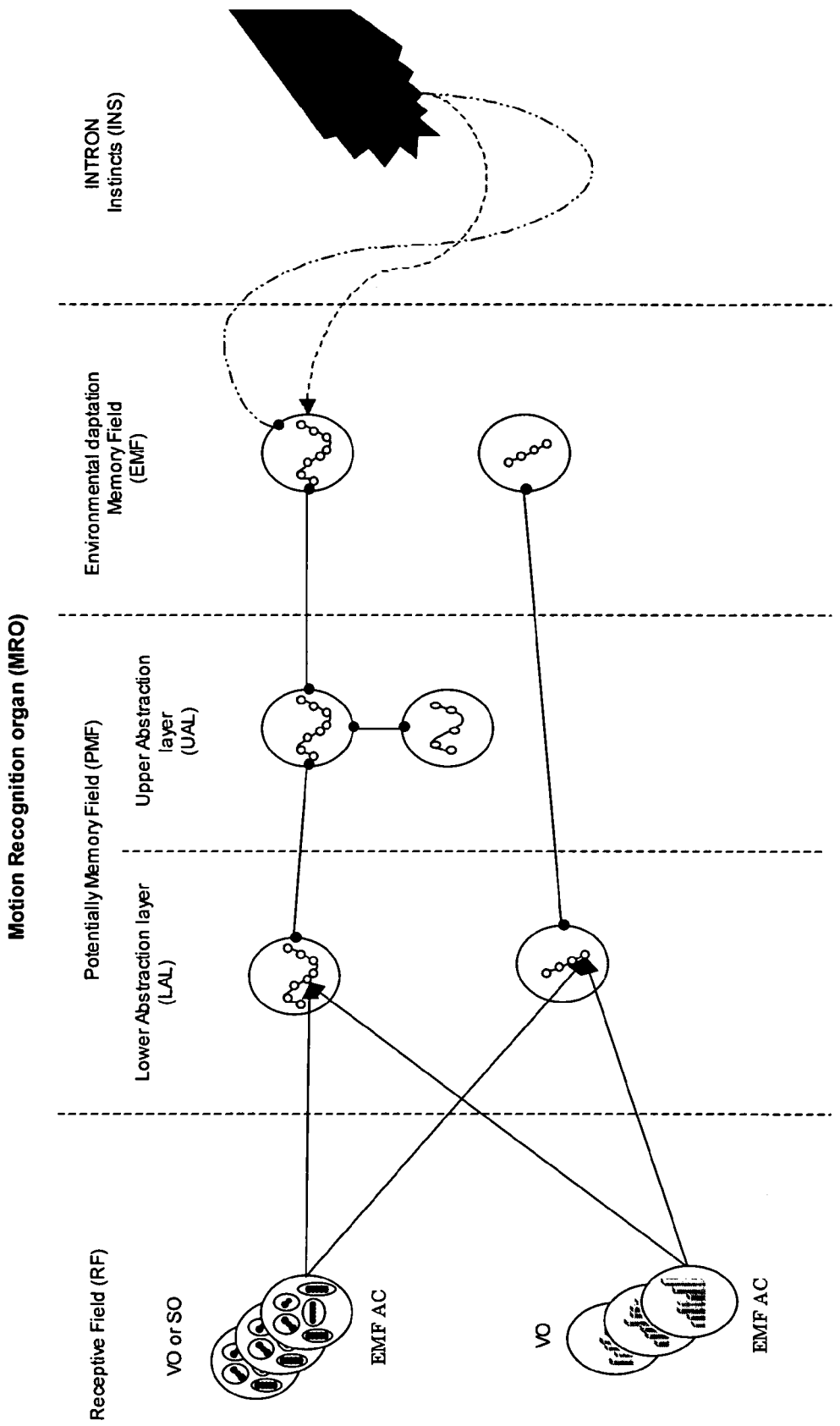
FIG. 5 is a diagram explaining the Motion Recognition Organ of an AL organism according to the SOM invention

RF of The Motion Recognition Organ: The Motion Recognition Organ (MRO) detects motion from GMC of EMFs of the Vision Organ, the Sense Organ, and the Auditory Organ as shown in FIG. 5. The various GMCs are compared serially to detect linear changes between time slices. In the figure this comparison produces line segments that create new GMCs in the LAL. These GMCs become connected with GMCs in the UAL and EMF in the same way as the other sense organs. Because the RCI of the MRO are based on serial changes, the MRO's operation is related to the AO described above. However, whereas the AO RCIs are representative of sound position and frequency, the RCIs of the MRO indicate motion.

The Receptive Organ: The Receptive Organ (RO) is similar in all of the sensory organs. It forms a common interface between the sensory organ and the "brain" of the organism. It comprises the PMF and EMF which have already been discussed in relation to the various sensory organs.

The Potentially Memory Field: The PMF consists of the Lower Abstraction Layer (LAL) that receives the RCI and the Upper Abstraction layer (UAL) that plays the role of buffer for short term memory storage. The PMF stores GMCs that become connected between the LAL and the UAL. The connected GMCs are "judged" by the INS and other parts of the "brain" of the INTRON.

The Lower Abstraction Layer: If an element of a GMC in the LAL has received a RCI, the GMC is recognized as the same form which is being sensed by the RF. The method of recognitions is according to the following conditions and by the number of the RCIs received by the elements of the GMC. If the Length, the Position, and the Angle and the number of the RCIs received are close to those of the target, then it is treated as identical to the target. From 90% to 100% similarity is recognized as being of the identical type. From 50% to 89% is in a gray zone. If there is less than 50% similarity, the GMC is ignored. The 90% point and 50% point must be determined in an adjustment stage. If new and generated RCI is recognized by the above method, it will be connected with the GMC that corresponds as an identical or gray zone GMC. In this way, the number of related GMC's should be continually increasing. Then, the LAL performs Natural Selection and thereby removes GMC in order of the GMC's of lowest frequency of use. Related GMC's that have not been destroyed by the Natural Selection are copied to the UAL (See FIGS. 13 and 14).

The Upper Abstraction layer: Most functions performed here are the same as the LAL. However, a GMC does not receive an RCI here; rather it connects with related GMC's in the LAL. Then, the UAL performs Natural Selection to delete unconnected GMCs. Related GMCs that were not destroyed by Natural Selection are copied into the EMF.

Figure 14:
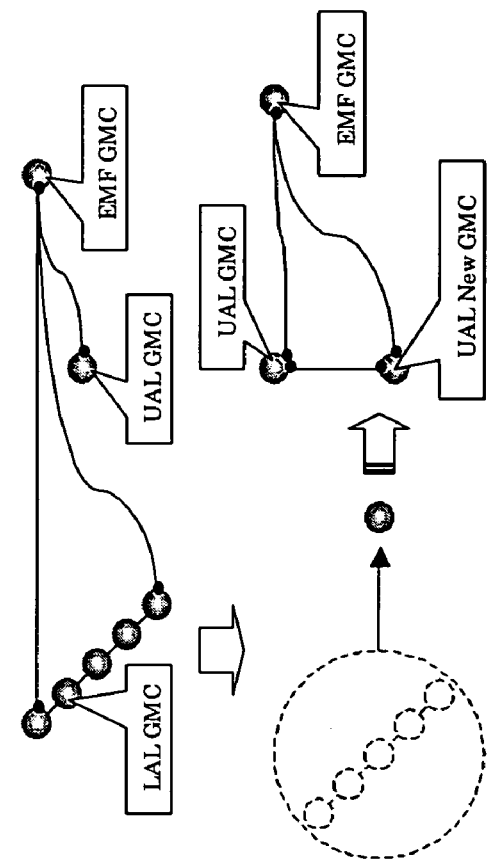
FIG. 14 is a diagram showing the functioning of the Environmental Adaptation Memory an AL organism according to the SOM invention.

The Environmental Adaptation Memory Field: Most of the functions performed here are the same as the UAL of the PMF. The GMCs here may be connected to either the UAL or the UAL and the LAL. The EMF then performs Natural Selection and the surviving GMCs become connected with the INTRON. FIG. 14 demonstrates a collection of GMCs formed by Natural Selection from a sensed shape (dotted circle). Those GMCs having a low Connective frequency are deleted.

Figure 7:
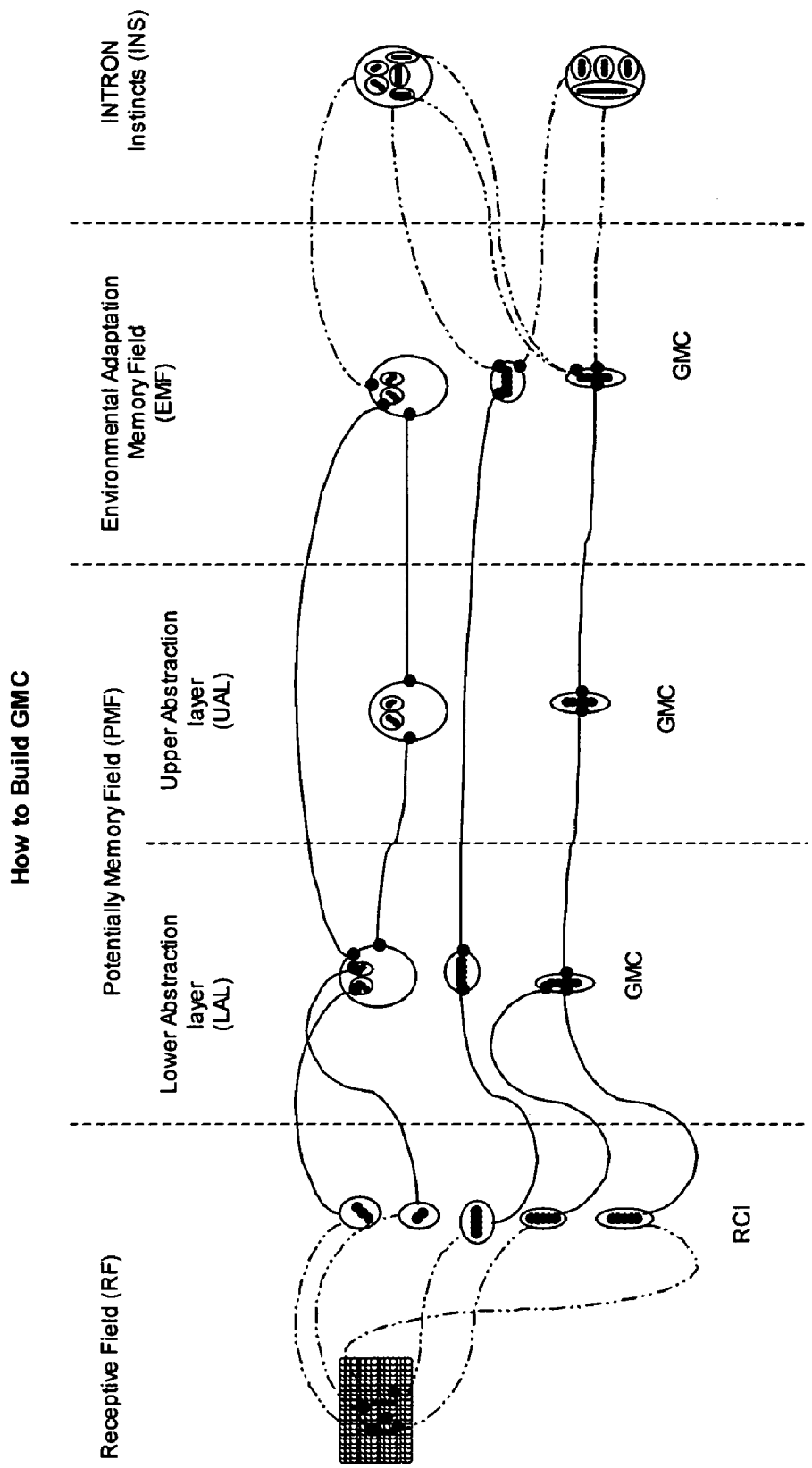
FIG. 7 is a diagram explaining the formation of a Geometric Connection (GMC) of an AL organism according to the SOM invention.
Figure 15:
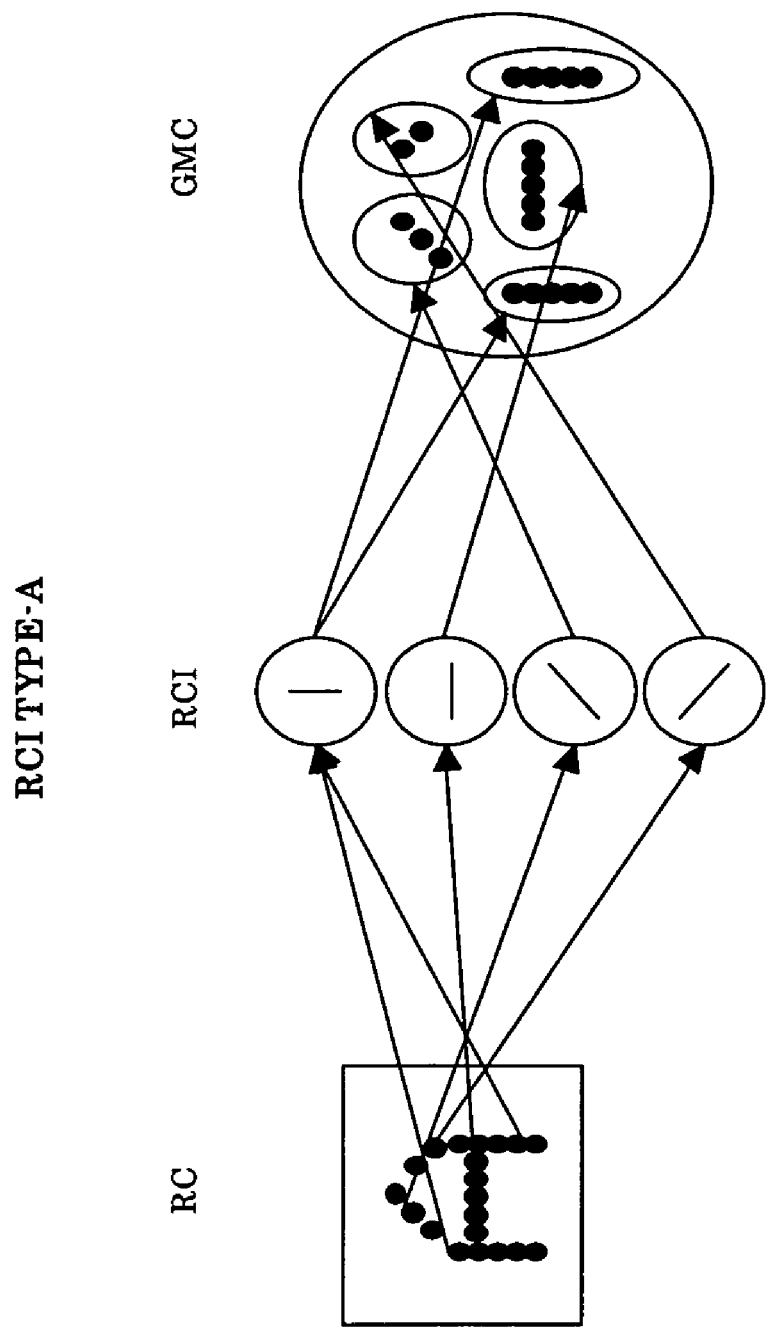
FIG. 15 is a diagram of RCI type A of an AL organism according to the SOM invention.
Figure 16:
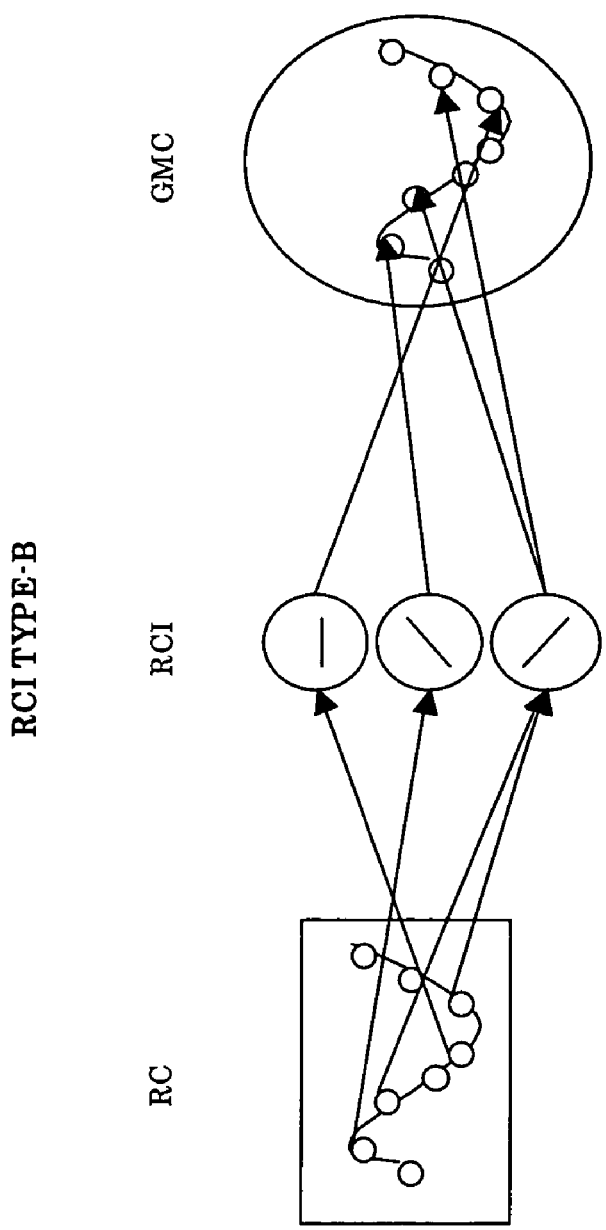
FIG. 16 is a diagram of RCI type B of an AL organism according to the SOM invention.
Figure 17:
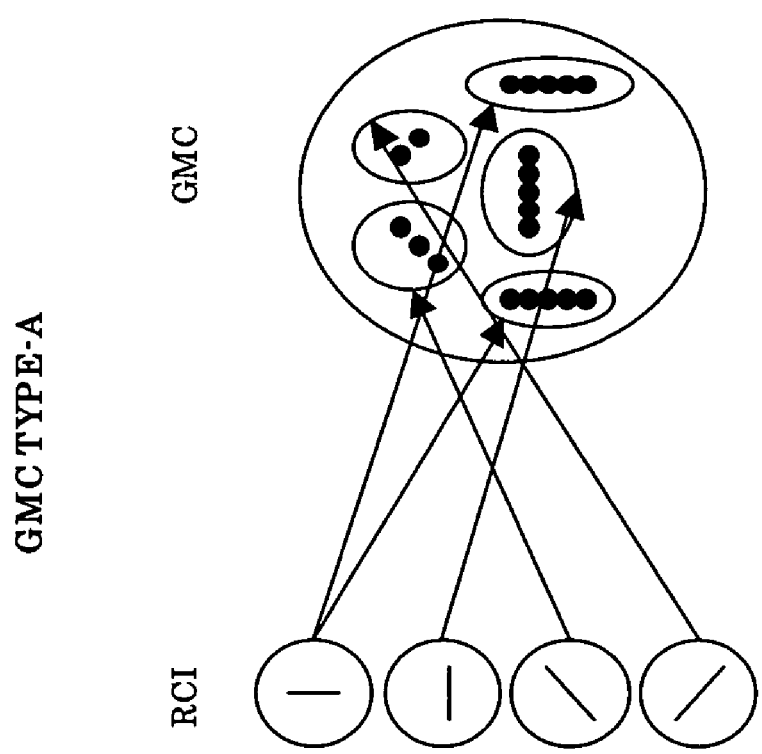
FIG. 17 is a diagram of a GMC type A of an AL organism according to the SOM invention.
Figure 18:
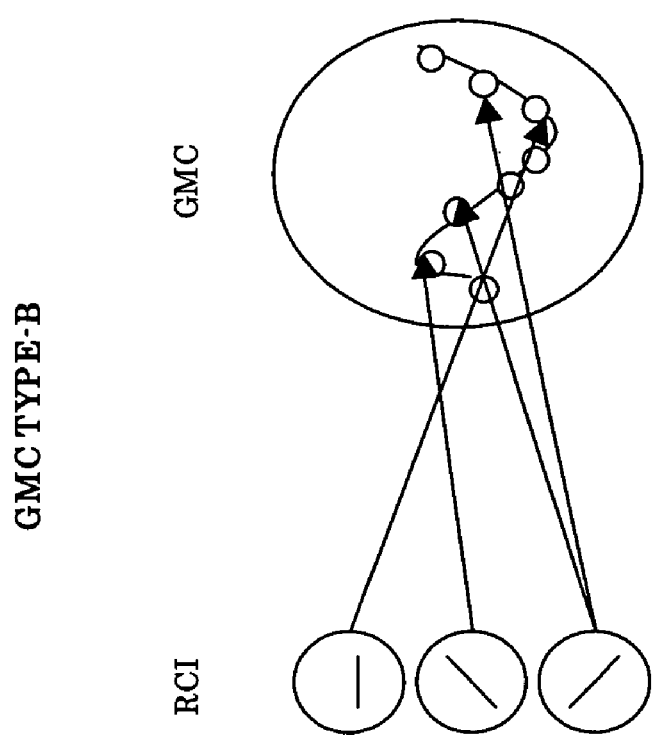
FIG. 18 is a diagram of a GMC type B of an AL organism according to the SOM invention.

Geometric Connection: Each GMC is a collection of RCIs. As shown in FIG. 7 the GMCs may form a perfect form (identical to the sensed form) or an imperfect form. And the RCIs inside a GMC may re-connect differently or even separately. Angle, Length, and Generating Frequency are represented by the RCIs. When an RCI is contained in a GMC, spatial relationship is also simultaneously represented by arrangement. FIGS. 17 and 18 show two different types of GMCs (Type A and Type B) in which the arrangement of the RCIs is coded differently. Type-A RCIs code dimensional information (FIG. 15) while Type-B RCIs code temporal information (e.g., a time series) (FIG. 16).

Figure 6:
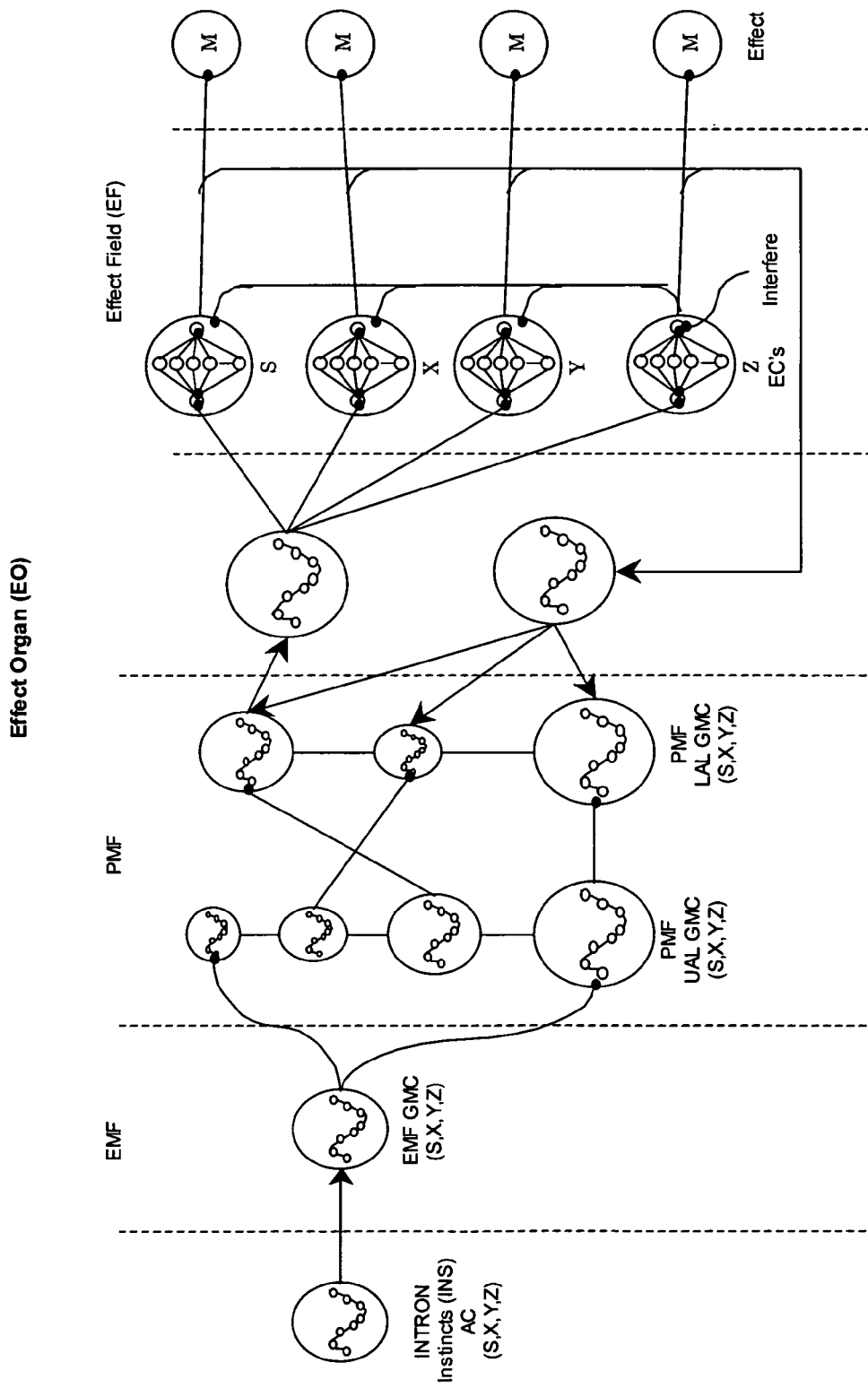
FIG. 6 is a diagram explaining the Effect Organ of an AL organism according to the SOM invention.
Figure 19:
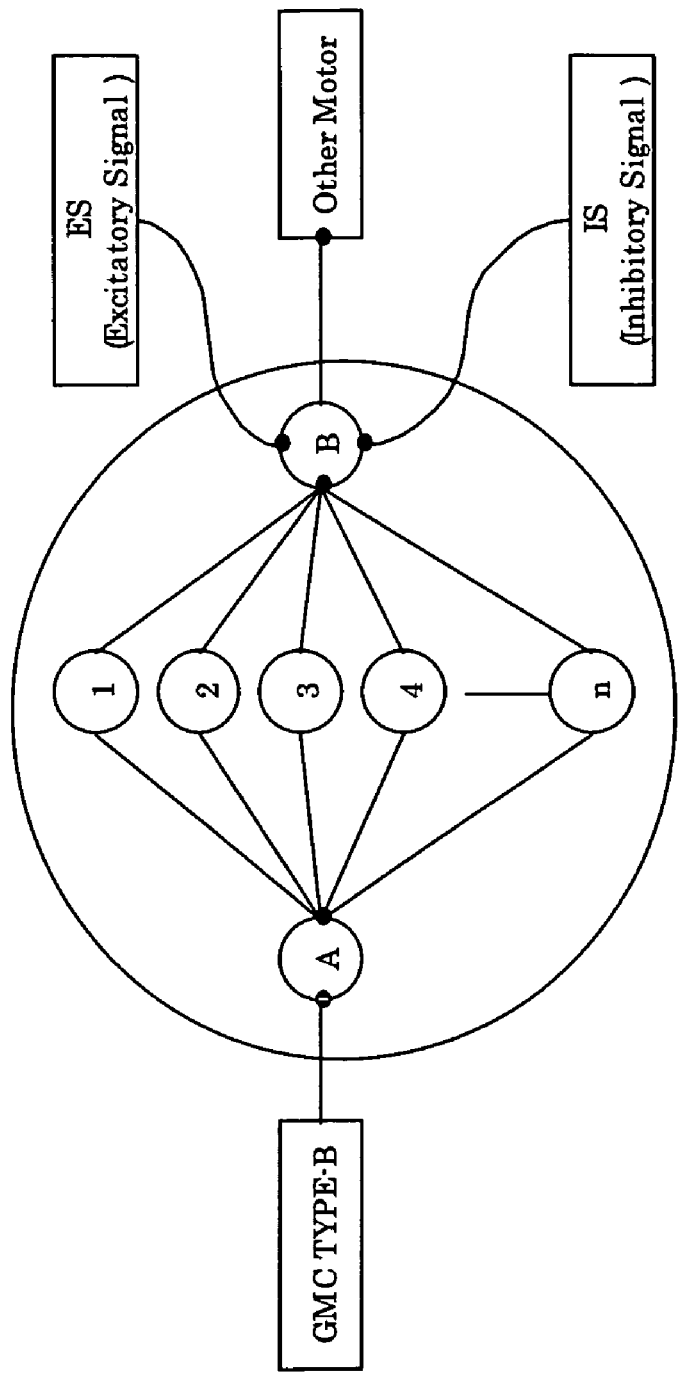
FIG. 19 is diagram of a GMC type C of an AL organism according to the SOM invention.

The Effect Organ: An Effect Organ (EO) is based on a special use of GMCs within an Effective Field (EF) to drive a moving element such as a motor. FIG. 6 shows the EF is made of a number of Effective Cells (ECs) which are connected to the INTRON (INS) by means of a Receptive Organ (EMF and PMF) Each of the cells within the EF drive an element M that produces an effect. As shown in FIG. 19 (GMC Type C) there is the Cell A that received the GMC TYPE-B of a time series. A Cell A (AC) sends a stimulus to n from Cell 1 that is drives element. The Cell 1 to n functions at each maximum of impulse. When it is divided into n from the Cell 1 and this is likened to ten steps, the maximum of the power of a motor is made into 100%, the Cell 1 takes charge of 1 to 10%, the Cell 2 takes charge of 10 to 20%, and, finally the Cell n takes charge of 90 to 100%. If 30% of stimulus enters from the Cell A, only the Cell 3 will react and 30% of stimulus will be sent to the Cell B. And the Cell B drives a moving element. By doing like this, even if one element is damaged, a motor does not stop completely. Furthermore, Cell B is affected by the Excitatory Signal (ES) and the Inhibitory Signal (IS). The ES increases the driving force of a moving element a maximum of 50%, and the IS inhibits the driving force of a moving element to 0%.

The Effect Field: The EC that takes charge of each Spin (S) and Horizontal (X), Vertical (Y), Depth (Z) is prepared in the EF (See FIG. 6). The number of the moving element to drive is prepared, and the EC drives the moving element to produce the Effect.

The Impulse Session: The Impulse Session (IS) takes the GMC from the output of the EC and feeds it back into the LAL of the PMF. This improves stability of the EC if a cell is damaged so that such damage does not affect the driving of a moving element. Stability is improved because the resulting new GMC is set to the most effective one by Natural Selection.

Figure 8:
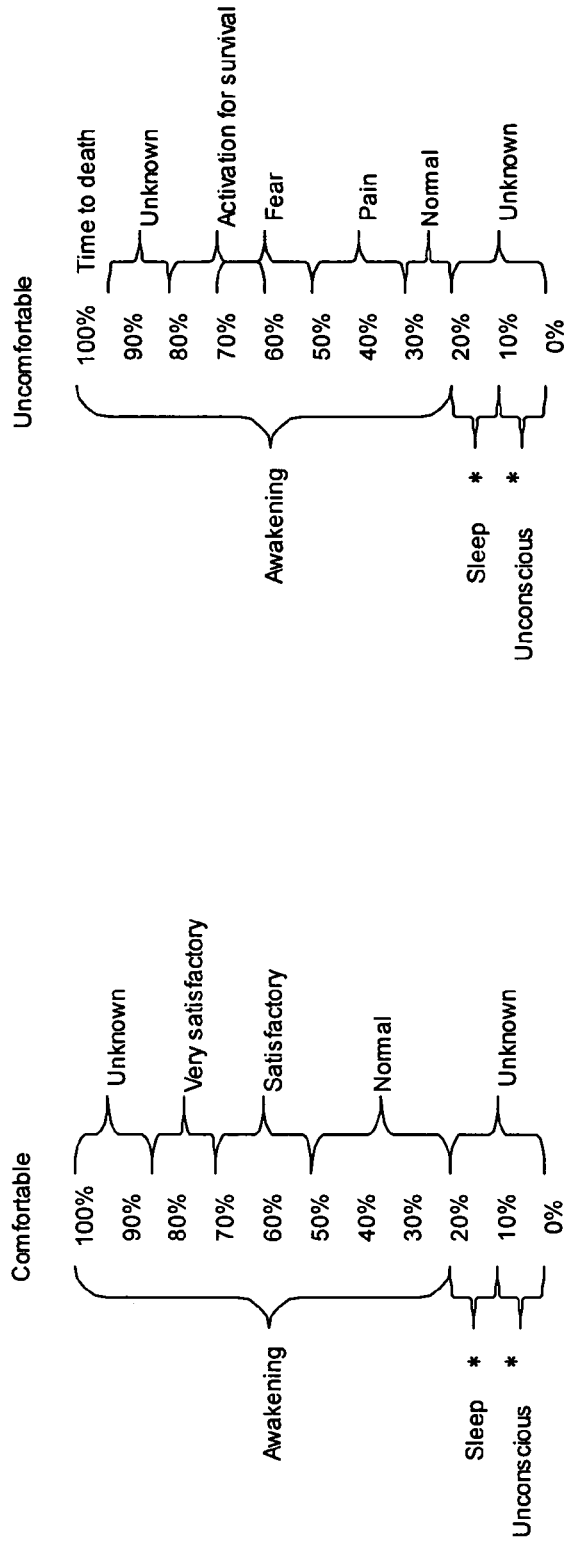
FIG. 8 is a diagram showing the ranking of states in the Comfortable and the Uncomfortable of an AL organism according to the SOM invention.

The INTRON:

FIG. 8 illustrates how the Instinct for Survival (IFS) operates. AL organisms always seek the Comfortable state. The Comfortable manages the comfortable state and looks for actions to increase comfortableness. The Uncomfortable manages the Uncomfortable state and looks for actions to decrease uncomfortableness. Although stages of Comfortable and Uncomfortable are usually inversely proportional to each other, Fatigue and Hunger are directly proportional to each other. Both have an Awakening level, a Sleep level, and an Unconscious level. The awakening level is a value pointing to the state being active, and the Sleep level and the Unconscious level show the state where the organism has become inactive. If both conditions fall between 20% and 10% activity must stop so that AL can sleep. If both conditions come between 10% and 0%, the AL becomes unconscious If the unconsciousness is prolonged, energy becomes depleted and finally death of the organism results. The details of each level are described to the following.

Comfortable (from high to low):
Unknown: This level is in the state beyond the highest joy; this state may also be the unknown level that changes with growth or evolution.
Very satisfactory: This level is the state of highest joy. This occurs in response to the Preservation of self or desire for the Preservation of self.
Satisfactory: This level is in the state of joy. This occurs in response to predation or desire for predation.
Normal: This level is the normal state for activity and the organism is most often found in this state.
Unknown: This state is caused by the proximity to the Uncomfortable and seeks the Comfortable. Because it is not a state of consciousness, it is unknown in terms of feeling This state may also be associated with growth and evolution.

The Uncomfortable (from high to low):
Death: Death occurs rapidly in this state so usually self-defense is invoked to avoid this state.
Unknown: This level is in the state that just below the worst situation. This state may also be the unknown level that changes with growth or evolution.
Activation for the Survival: This level is the state of asking for the situation of increased comfortableness that obtains hope that conquers fear. That is, since an increase of uncomfortableness beyond this causes death, this is the level that tries to prevent such an increase.
Fear: This level is in the state leading to fear and the organism acts to escape fear or asks for such escape.
Pain: This level is in the state of feeling the pain. The organism acts to escape the pain or asks for such escape. Pain includes both physical bodily pain and mental pain.
Normal: This level is the state for usual activity, and the organism is mostly found in this state.
Unknown: This state was caused by proximity to the comfortable. This is also the unknown level that is experienced with growth or evolutions.

Please note each stage has two meanings. (1) The level that is perceived as the result of input from the Receptive Organ; (2) The level that results from the organism having performed a certain action in response to the ISA.

Figure 9:
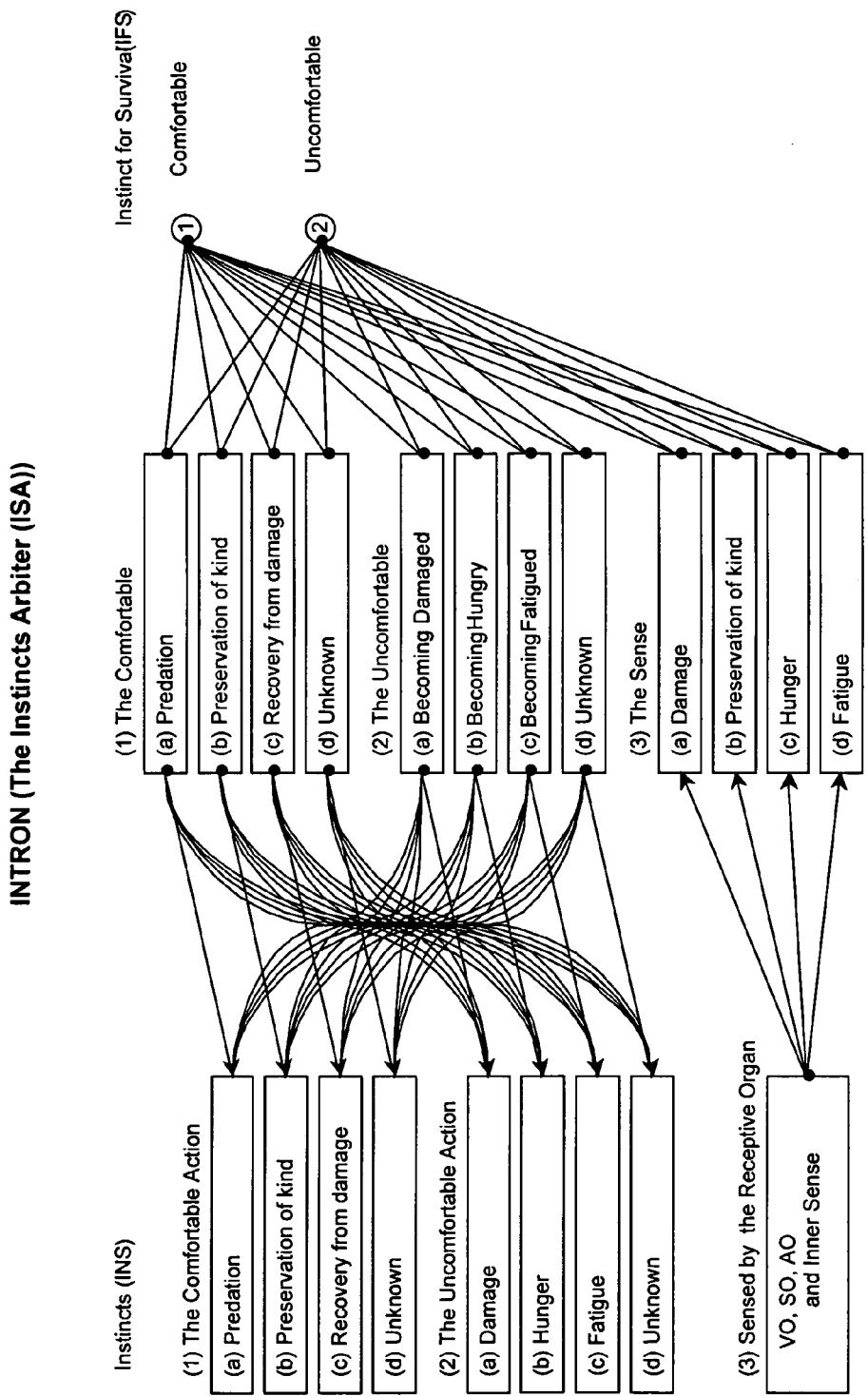
FIG. 9 is a diagram of information flow within the Instincts Arbiter of an AL organism according to the SOM invention.
Figure 11:
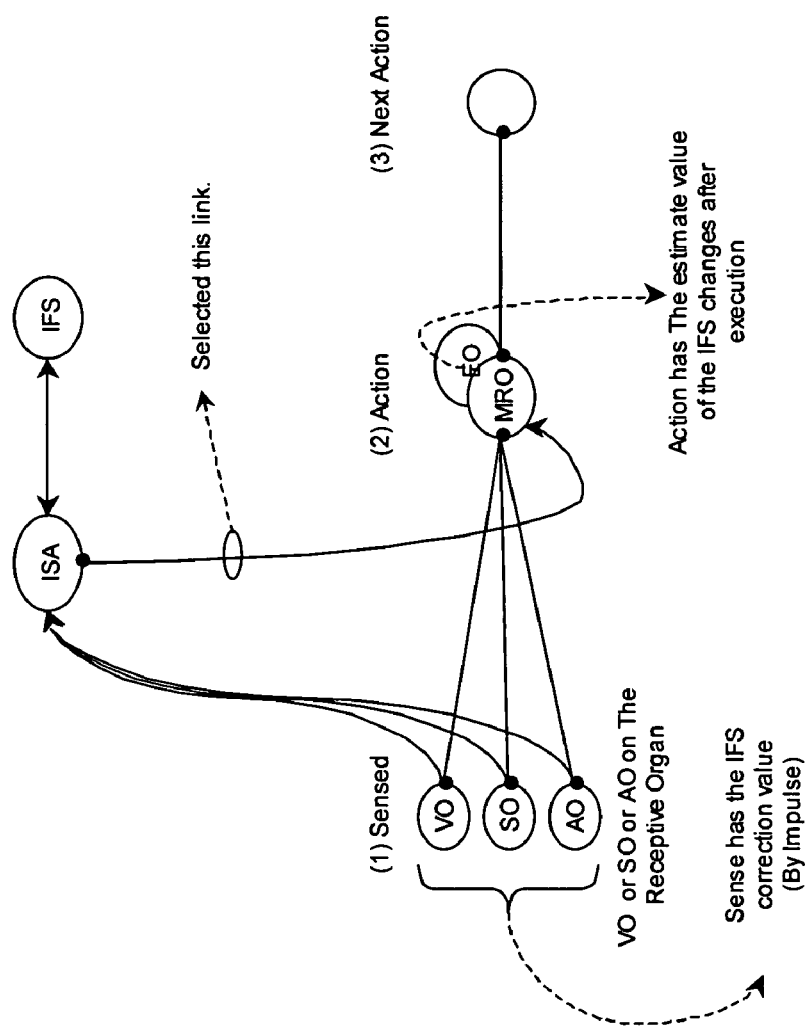
FIG. 11 is a diagram illustrating the Execution Phase of the Instincts in an AL organism according to the SOM invention.

The Instincts Arbiter (ISA): FIG. 9 shows how the ISA is the foundation of causal relationships. All Causal Relationships of the INS are derived in the following manner:

Reception of the State: The ISA receives state information from the Sense Organs through the Receptive Organ. The sensed information will update the IFS as shown in FIG. 11. Basically the sensed information will result in an appropriate action by means of the MRO. For that purpose a connection is made directly to the MRO (as explained previously); at the same time the information connects to the ISA which communicates with and is influenced by the IFS. This results in a link to the MRO whereby the INS promotes or inhibits the action. The dotted lines show that sensed information also directly updates the IFS by means of an IFS Correction Value. The MRO similarly updates the IFS to provide an estimate of the likely state of the IFS following execution of an action. In making a link to the MRO the ISA selects the Causal Relationship which has the highest probability of increasing Comfortable and decreasing Uncomfortable as influenced by the IFS correction value. However, if the Estimate Value of the IFS changes after execution of the action, the INS activates the IFS rather than selected sensed information and the ISA selects on this basis. This imbues the selection process with an ability to look ahead and anticipate or "imagine" the outcome of a proposed action and to use this anticipated outcome in making the actual choice.

The IFS Correction value is the "standard" or the target for an action. The Estimate of the Likely State of the IFS is the result of an action. If the AL organism acts and the Estimate of the Likely State is close to the IFS Correction Value (i.e., the target has been achieved), then comfortableness increases. However, if the Estimate of the Likely State diverges widely from the IFS Correction Value (i.e., the target is not achieved), this result is uncomfortable and the AL organism learns not to take that action in the future.

The following explain a Comfortable Action as shown in FIG. 9:

Predation: An action resulting in charges of energy level from empty to full will fall between 1% and 70% in the Comfortable. Further, the comfortable state will change according to rate of charges of energy, and the uncomfortable state will fall according.

Preservation of self: An action resulting in preservation of self (e.g., INS data transfer) will fall between 50% and 80% in the Comfortable. Requests for the preservation of self where the transfer yields a high performance and powerful body will result in the comfortable will changing according to the state of new body. In the case of a high performance and powerful body, 80% may be obtained with the uncomfortable state falling accordingly.

Recovery from damage: An action that repairs damage will fall at 30% in the comfortable. Further, the comfortable state will change according to rate of recovery from breakage, and the uncomfortable state will fall accordingly.

Unknown: An action promoting growth and evolution may fall at this level of comfortable.

The following explains an Uncomfortable action as shown in FIG. 9:

Becoming damaged: Depending on the amount of damage, the comfortable will be lowered to 0% and the uncomfortable will be raised to 100%—or to levels in-between according to the amount of breakage.

Becoming Hungry: Depending on the level of hunger, the comfortable and the uncomfortable will be lowered to 10%.

Becoming Fatigued: Depending on the amount of information to be processed by Natural Selection, the comfortable and the uncomfortable will be lowered to 10%.

Unknown: This is the low level of comfortable and Uncomfortable that changes with growth or evolution.

As shown in FIG. 11 when the ISA is affected by the Receptive Organ, the IFS are also activated, and the ISA will execute a Causal Relationship with the INS. The ISA will execute the next action, if the correct signal is received from the ISA. Furthermore, if the Causal Relationship of the INS is executed as an action, the Sense (FIG. 9) will also update the IFS.

The Comfortable and the Uncomfortable action will be undertaken not only by a single AL organism but by that organism's partner. This becomes the foundation of communication. This circulation will also change the Causal Relationship of the INS.

Figure 10:
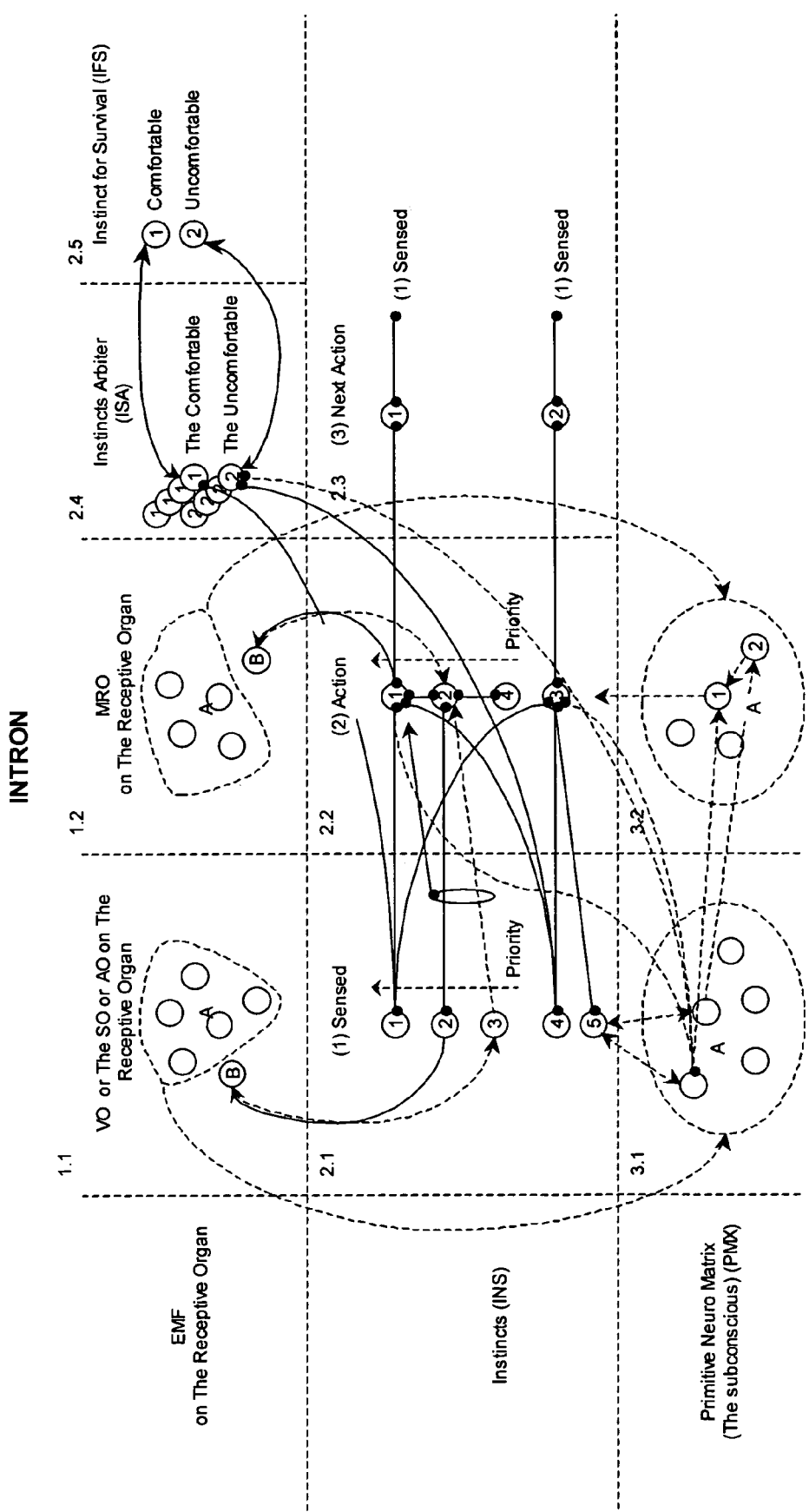
FIG. 10 is a diagram showing subdivided Causal Relationships in an AL organism according to the SOM invention.

Instincts: INS is made up of the Causal Relationships existing in the ISA. The Subdivided Causal Relationship of FIG. 10 is based on this. Furthermore, FIG. 10 conceptualizes an explanation of the Execution Phase, the Evolution Phase and Natural Selection and will be explained in the following paragraphs.

Execution Phase: The Causal relationships 1, 2, 4, and 5 of region 2.1 are created in advance and are predefined in INS according to the Life Code. The Next Action of region 2.3 represents a connection with 1 of the sensed time series in region 1. It is possible always to connect the reception result and action with a time series in this way. Furthermore, the Causal Relationship of the following should also be in the Life Code.

1—Process, which transmits the situation to the ISA based on the GMC from The Receptive Organ;

2—Acts according to the result of the ISA;

3—Acts according to the organism's own intention; and

4—Acts resulting from stimulus from the Receptive Organ.

Furthermore, "1, 2, 4, and 5" of FIG. 10, region 2.1 are divided as follows: 1 and 2 represent Comfortable connections. While, 4 and 5 are Uncomfortable connections and both may inhibit actions. The method is the same as the ISA. Furthermore, the Life Code should also define the Comfortable and Uncomfortable connections. If there is a GMC which corresponds in the Receptive Organ to 1, 2, 4 or 5, the Causal Relationship will be executed as following. According to the Sensed of FIG. 11, the IFS state corresponding to the situation that each Receptive Organ sensed is sent to the ISA. Various situations exist here. Therefore, as shown in the FIG. 10, the Sensed and the Action may contain multiple possible actions. The Causal Relationships of the plurality are transmitted to the ISA. The ISA, the IFS correction value of the Sensed and the estimated value of the IFS changes after execution of Action are prioritized in terms of The Comfortable increasing and the Uncomfortable decreasing so that the most favorable action of the causal relationship can be selected. This is executed by the ISA. As a result, if the expected situation is repeatedly perceived by the IFS, there is no problem. But if an unexpected situation is perceived by the IFS, it will be judged as a new state, which will be copied to form a new Causal Relationship and will be connect to the Comfortable or the Uncomfortable. As the result of execution of the Causal Relationship the ISA decides to which of the Instincts it connects If result is Comfortable, it will become an action of the Comfortable. If result is Uncomfortable, it will become an action of the Uncomfortable. The Execution Phase is realized by defining such processing. If the Causal Relationship executed according to the execution phase is closer to the purpose than another related causal relationship, the priority of the Causal Relationship increase.

Note that a Causal Relationship may connect to a time series where the overall situation changes with the series. Here the INS perceives a different momentary event from a time series little-by-little. Thereby, the PMX is affected. However, AL does not recognize this transient event. But if the PMX is affected, the Causal Relationship of this event must be unconsciously formed over time. This characteristic is useful for growth of the reflex action or discovery. However, a hypnotic effect may be brought about with a negative effect on the AL organism. Thus, if a momentary event cannot be fully processed, it may be necessary to create a filter so that such an event is not recognized. However, after the AL organism accomplishes growth, it may be possible and advantageous to process momentary events because such processing can favor overall growth.

Evolution Phase: The GMCs in region 2.1 and 2.2 of FIG. 10 are added GMCs that connect with similar GMCs from the EMF of the Receptive Organ. Then, each GMC connects to newly added GMCs so that connection of the GMC is extended. This is shown by B of region 1.1 connecting to 2 and 3 of region 2.1. This may be followed by connections with others and by re-connection of the PMX or the AMX as a result of execution. Furthermore, 2 and 3 of region 2.1 may be connected to 1 of region 2.2 by means of Natural Selection in the INS.

The Primitive Neuron Matrix:

Recursive Connection Phase: FIG. 10, region 3.2 shows the PMX where a GMC of region 2.2 of the INS has less RCI than the sensed RCI, and if there is a GMC that has nearly same result, its GMC will be added to the connection of region 2.2 of the INS. This new Causal Relationship will be executed by the Execution Phase of the INS and will form a perfect causal relationship. The Recursive Connection Phase is then complete.

Trial and Error and Fusion Phase: The PMX also receives the GMCs that do not correspond to ones from the EMF of The Receptive Organ. The GMC is held here until the GMC that corresponds to region 2.1 of INS is generated into the INS. If corresponding GMC generates into the INS, it connects with the relation of the GMC of the INS. The GMC 5 that waits here is expected to be used by the AMX. Two GMC's A of region 3.1 relate to it, and the GMCs are also connected with their Related Phenomena. These are same as region 3.2. At this time, these two GMCs make Causal Relationships to 5 of the INS, and new Causal Relationships are also made to two GMC's A of region 3.2. However, if there is nothing corresponding on the GMCs of region 3.2, connections will be made with the Comfortable or Uncomfortable of the original ISA. This new Causal Relationship will be executed by Execution Phase of the INS and, it will form a perfect causal relationship. As a result, the GMC executed in two GMC's of the A of region 3.1 was connected to 2 of region 2.4.

The Causal Relationship already related with the GMC in the PMX to the INS is copied to the domain of the PMX. Furthermore, in all combinations, re-connection is made at random and the result is newly entered into the PMX domain as a new Causal Relationship. This new Causal Relationship is circulated through the Recursive Connection Phase of the PMX so that the Relationship undergoes a process of reconnection. This Causal Relationship is also executed as in the Trial and Error and Fusion Phase, and first becomes a perfect causal relationship. Therefore, actions of Comfortable and Uncomfortable are made, and accidental discovery is realized.

Natural Selection: According to the size of the PMX domain and the rate of the incomplete Causal Relationship therein, the ISA lowers both Comfortable and Uncomfortable of the IFS. The end result is visible as fatigue. The Life Code should define the rate of decrease. If this reaches the arbitrary values defined for the domain, the PMX will delete the Causal Relationship through the Natural Selection much like the PMF.

Natural Selection is then performed on the next GMC or Causal Relationship. A GMC without Causal Relationship is removed from the INS. Likewise, the GMC with the lowest priority connected to the Causal Relationship is removed, and, Natural Selection is performed on GMCs that do not affect activity The same processing as is used for Natural Selection of the PMF is performed. Activity is determined as follows: if the minimum connective frequency is 0% and the maximum is 100%, Natural selection is performed on GMCs showing causal relationship connectivity between 0% and 10%.

When Natural Selection does not catch up and Comfortable and Uncomfortable fall too low, activity of the AL organism stops. Natural Selection of PMX is then performed to correct the situation. Any GMC without the Causal Relationship is removed from the INS. In addition, Natural Selection is performed on all GMCs with the same Causal Relationship in the PMF. Again the same processing used for Natural Selection of the PMF is performed.

The Advanced Neuro-Matrix (AMX):

In the AMX all GMC's of the EMF of the Receptive Organ are abstracted. For example, the MRO is likened to an image and set to the GMC of VO. The possibility of new discovery is provided by re-connecting these abstracted GMC's at random. To extend such possibilities furthermore, there is conscious trial and error. This results in a new causal relationship, and as a result new and more advanced Causal Relationships are formed.

Conscious trial and error: The AMX makes two-types of re-connection. In the first type the Causal Relationship of the PMX domain that makes future re-connections, makes a copy of itself to prevent damage of original Causal Relationship, and connections with the GMC of Sense or Action are made at random (see region 2.1 of FIG. 12). In addition, the Causal Relationship from the PMX is re-connected, and the Trial and Error and Fusion Phase of the PMX is repeated.

Figure 12:
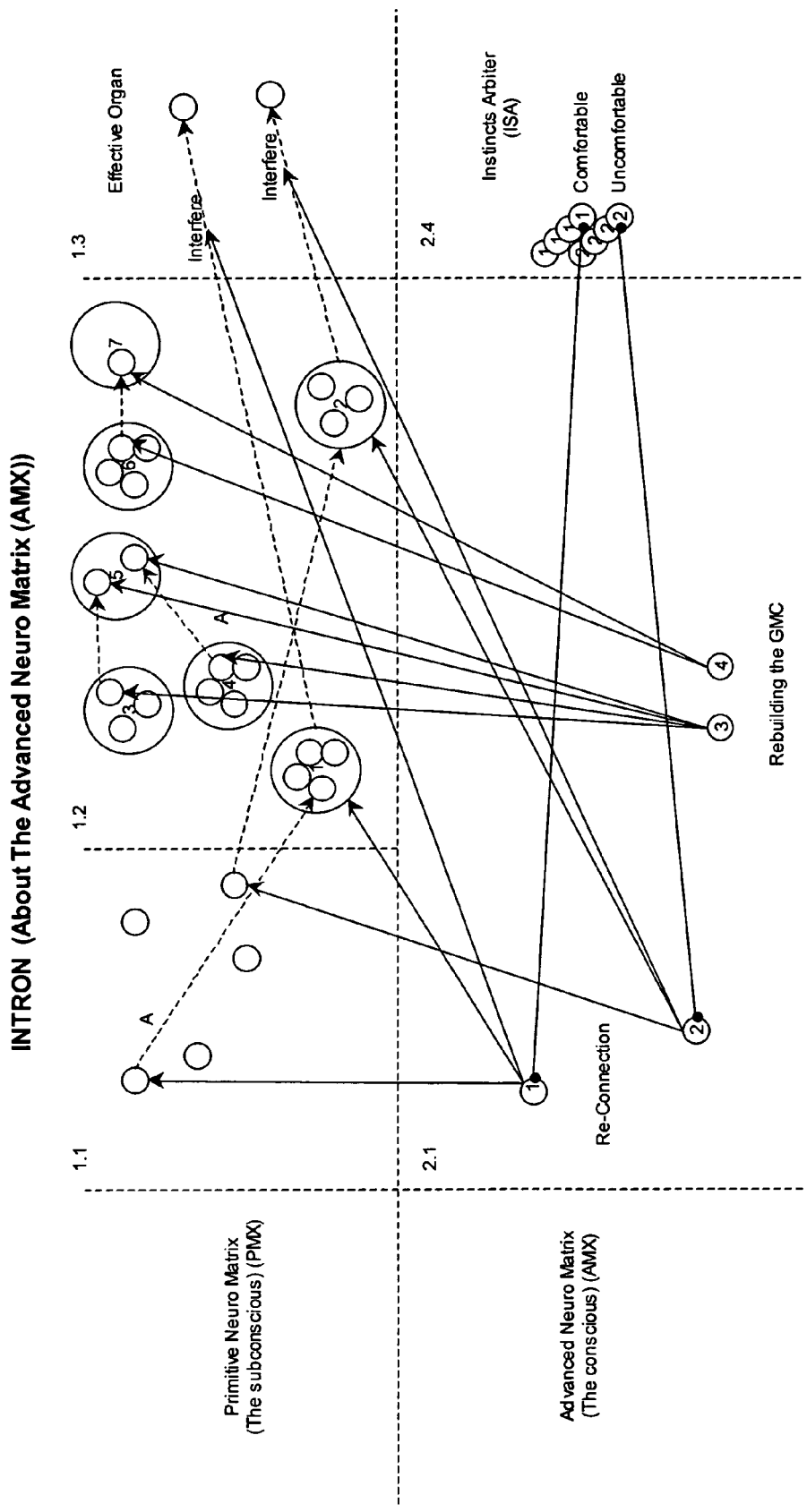
FIG. 12 is diagram illustrating the functioning of the Advanced Neuro Matrix of an AL organism according to the SOM invention.

In the second type of reconnection, the AMX reduces the complexity of the GMCs from RCIs of Sense and Action and the Causal Relationships of the PMX domain (see region 2.1 of FIG. 12). For example, RCI Type-A in FIG. 15 is composed of five pieces, but similar results can be obtained by "reducing the complexity" to three pieces. However, when this reconnection is performed for the AO and the MRO, it also involves a time series. In addition, the GMC rebuilt here repeats the Recursive Connection Phase of the PMX.

In the AMX, re-connection by conscious trial and error is performed by the following method.

Trial and error of Level1: This method interferes with a motion of the Effect Organ as indicated in region 1.3 of FIG. 12. Because activity of the Effect Organ is stopped, this method is best performed as a background process.

Trial and error of Level 2: This method does not inhibit a motion of the Effect Organ. If there are no abnormalities in an effect organ as a result of this execution, conscious trial and error of AMX will be achieved. This process is performed when AL is at rest (e.g., a situation where there is sufficient food, where preservation of self is unnecessary and where there is no other problem—not unlike a human day dreaming and imagining an idea).

The Life Code: The following explains the structure-of the Life Code and provides an explanation of Recognition and of Action. The Life Code is a collection of Element(s) (GMCs) for making Recognition(s) either through hardware or software. The Intron recognizes its Element(s); for example, if an AL organism is moving forward, the course may be barred so that the organism cannot move forward. In this case two Element(s) ("Turn Left 90 degrees" and "Turn Right 90 degrees") are already prepared for the AL organism in the Life Code, and the AL organism chooses either suitably and goes forward. The act is generated from these two elements; while the organism gains experience, movement in many directions is recognized, and a Causal relationship is made to the INS as a new element. If an Architect expects and intends growth of the AL organism, he should make many Element(s), in the Organ(s) that require Life Codes (see above).

Recognition: Recognition requires the following rough judgments. In terms of form, it is judges if the form is smooth or sharp. In terms of color, it is judged if the color is Red, Blue, Green, Black or White (since all possible colors can be formed from these). In terms of motion, it is judged if perceived motion is smooth, jerky, slow or quick. In addition, it is judged if the motion is towards or away from the AL organism. In terms of sound, it is judged if a sound is loud or soft, base or treble. In terms of sensed contact it is judged if the contact is damaging or a harmless soft touch.

The above Element(s) for judgment are all related to the IFS and are presented to the ISA and the INS as GMCs. These fundamental judgmental standards will be extended by the PMX and the AMX.

Action: Action is subdivided and prepared. Furthermore, information about the power or the speed of motion which exceed the capacity to the extent that the body is destroyed must also be prepared. Actions are subdivided; for example if an Action moves the arm and the hand, the Action for each joint (articulation) must be made through the EO. Next, the INS selects the easy Action required. The Action, itself, is subdivided according to the structure into "the act that lengthens an arm" and "the act that moves a hand." If these actions are made, they will be extended by the PMX and the AMX. Furthermore, AMX makes the combination of these motions.

Computer Design: If an AL organism according to SOM is realized by computers, there will be five building blocks:
 a—The Sensory Organ (SO)
 b—The Receptive Organ (RO)
 c—The INTRON (INS, the PMX, the AMX)
 d—The Effect Organ unit (EO)
 e—The Moving Elements It is possible to use current computer technology to create an organism according to SOM. In a computer realization of a SOM organism almost all the computer power is concentrated to the data processing and the data transfer. Since the functions are occurring simultaneously, i.e., parallel processing, and multitasking, data transmission speed can be more important than the power of a single CPU. A network of processing means serves as the actual nerve cell, and this network changes with growth and experience. Since an inanimate object can't actually perform physical growth, the fundamental network is realized by the hardware while the portion that changes with growth or experience is realized through software. If the distributed processing of The RO, INS, PMX, AMX and EO is well implemented, any possible bottlenecks will be minimized. If the system follows the SOM algorithm faithfully, distributed processing will be realized naturally.

Figure 20:
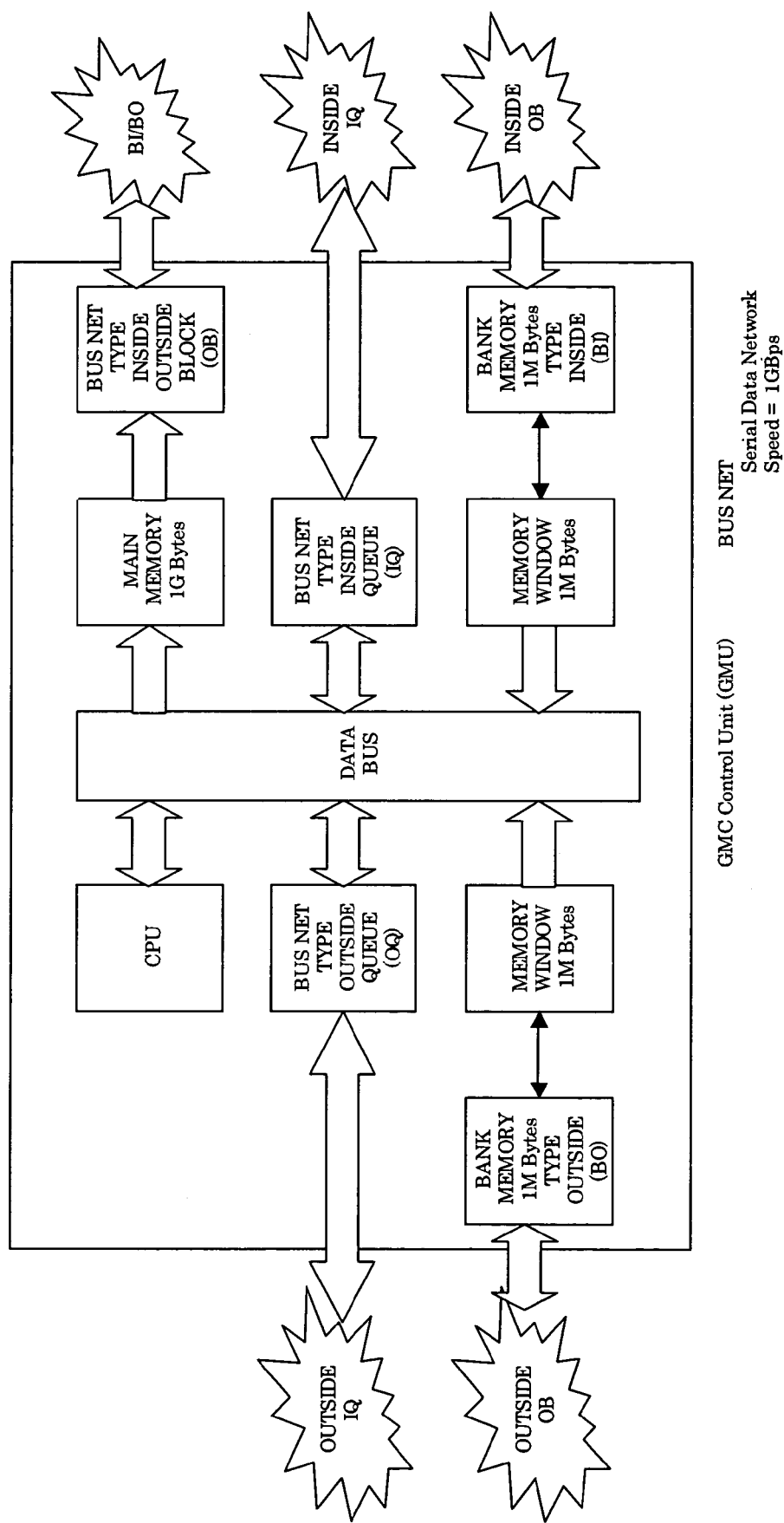
FIG. 20 is a diagram of the hardware component of a GMC control unit an AL organism according to the SOM invention.

FIG. 20 shows a block diagram of a computer technology implementation of a GMC control unit (GMU). A plurality of parallel GMUs is used to create the SOM network. In the GMU the CPU executes the fixed algorithms of the RO, INS, PMX, AMX, EO according to the rules of SOM as explained above. It also processes the Life Code. The Main Memory is the work area required for the Life Code for the data newly made newly in each processing.

INSIDE versus OUTSIDE: If, for example, the INS consists of two or more GMU boards, INSIDE is the data path between the boards. OUTSIDE is the data path that connects the RO, INS, PMX, AMX and EO. In this way, there are data queues which communicate with each board through each data path. Each GMU also contain Bank Memories which are memory maps for accessing the Main Memory through a Memory Window from other boards (both Inside and Outside). A Bus Arbiter (not shown) intervenes between the Bank Memory and the Main Memory to allow free access by other GMU boards. Furthermore, this becomes a dynamic memory map that other boards can access for exclusive use at the Bank Memory.

These functions can be realized without side by side boards. It is possible to use distributed process through the Internet or other network to handle part of the processing of the INS(s), PMX(s), and AMX that are not affected by speed. It is also possible to realize the other functions by distributed processing through the Internet.

Figure 21:
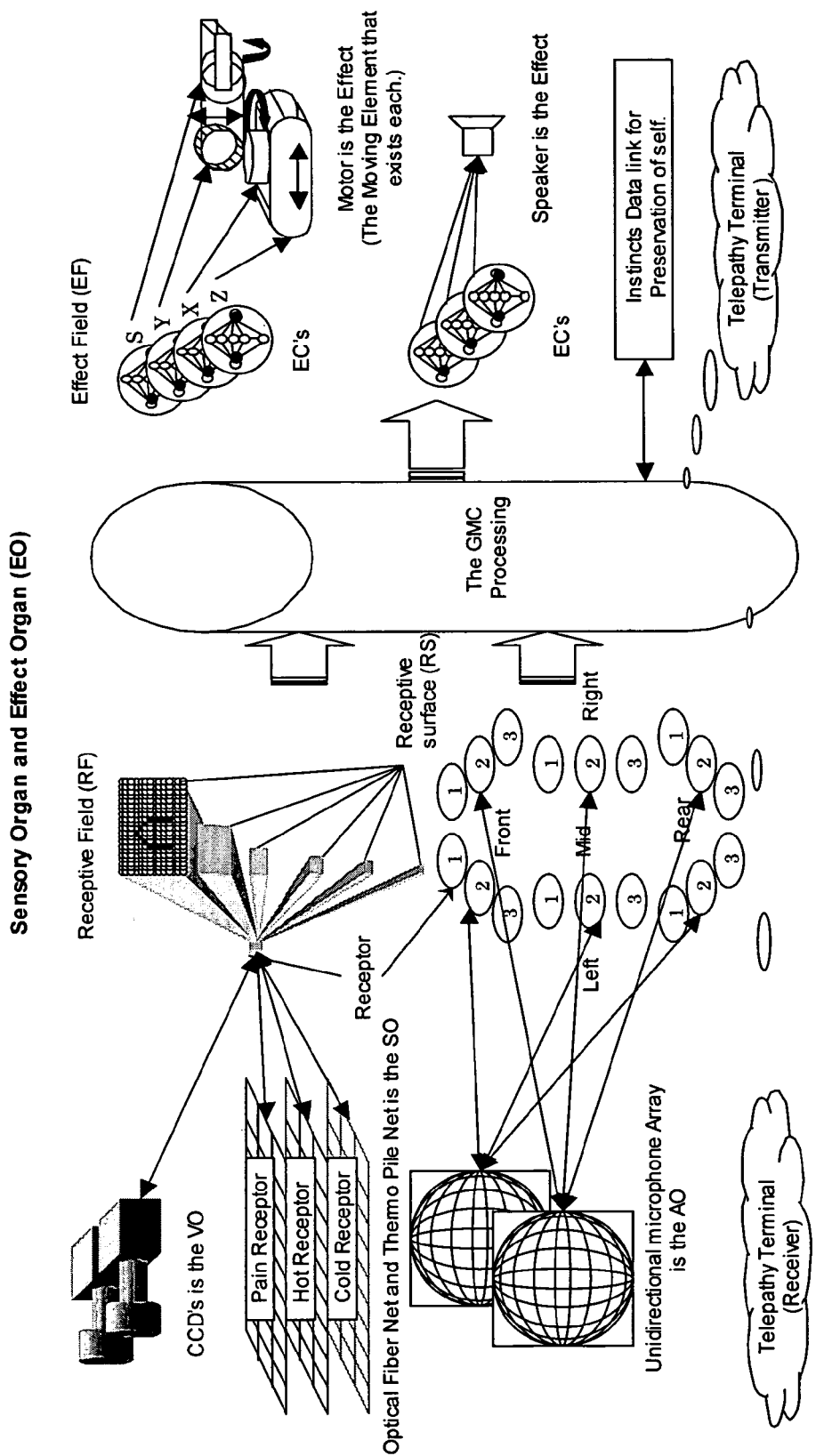
FIG. 21 is a diagram showing the sensory organs and the effect organs and their relationship to the GMC processing in an AL organism according to the SOM invention.

Composition of the Sensor and the Effect Organ: FIG. 21 shows how Sensors and the Effect Organ are realized through computer technology. The VO, the SO, and the AO are required Receptors (as explained above) but may use different Sensors. Furthermore, each AL organism has a special interface for connecting to and communicating with other AL organisms and sensing signs of other AL organisms. This consists of a "telepathy" receiver and transmitter. The RF for collecting information from the sensors offers three kinds of interfaces to the GMU for GMC processing. First is an interface for the two dimensional information that is not related to a time series. This type is used to get receive information from sensors of the VO or the SO type. The second type of interface is for acquiring the three dimensions information that changes according to a time series. This type is used to receive sound and coordinates of the motions of the VO, the SO, and the AO. Finally, the third type of interface is for communicating with other AL organisms. In the Effect Organ, the Moving Element for moving the body and a speaker for communicating are required. Furthermore, the Instincts Data link for Preservation of self is also required.

GMC Processing is central of the SOM. The GMU of FIG. 20 is used in parallel for this purpose (see FIG. 22) Generally, the sensors and effects used here have already been explained. However, the sensor of the SO deserves a separate explanation. The Pain Receptor is a pain sensor consisting of a matrix or net of the optical fiber. If pressure is added into the intersection of the fiber, changes of pressure will become changes in the transmissivity of the light. Thus, pressure is sensed as pain correlating with changes in the transmissivity of the light. However, this sensor is not always effective and may be modified as required. Next, the Hot and Cold Receptor is a thermopile (matrix of thermocouples) that detects heat. The minimum function of AL needs the above Sensors and Effects.

Figure 22:
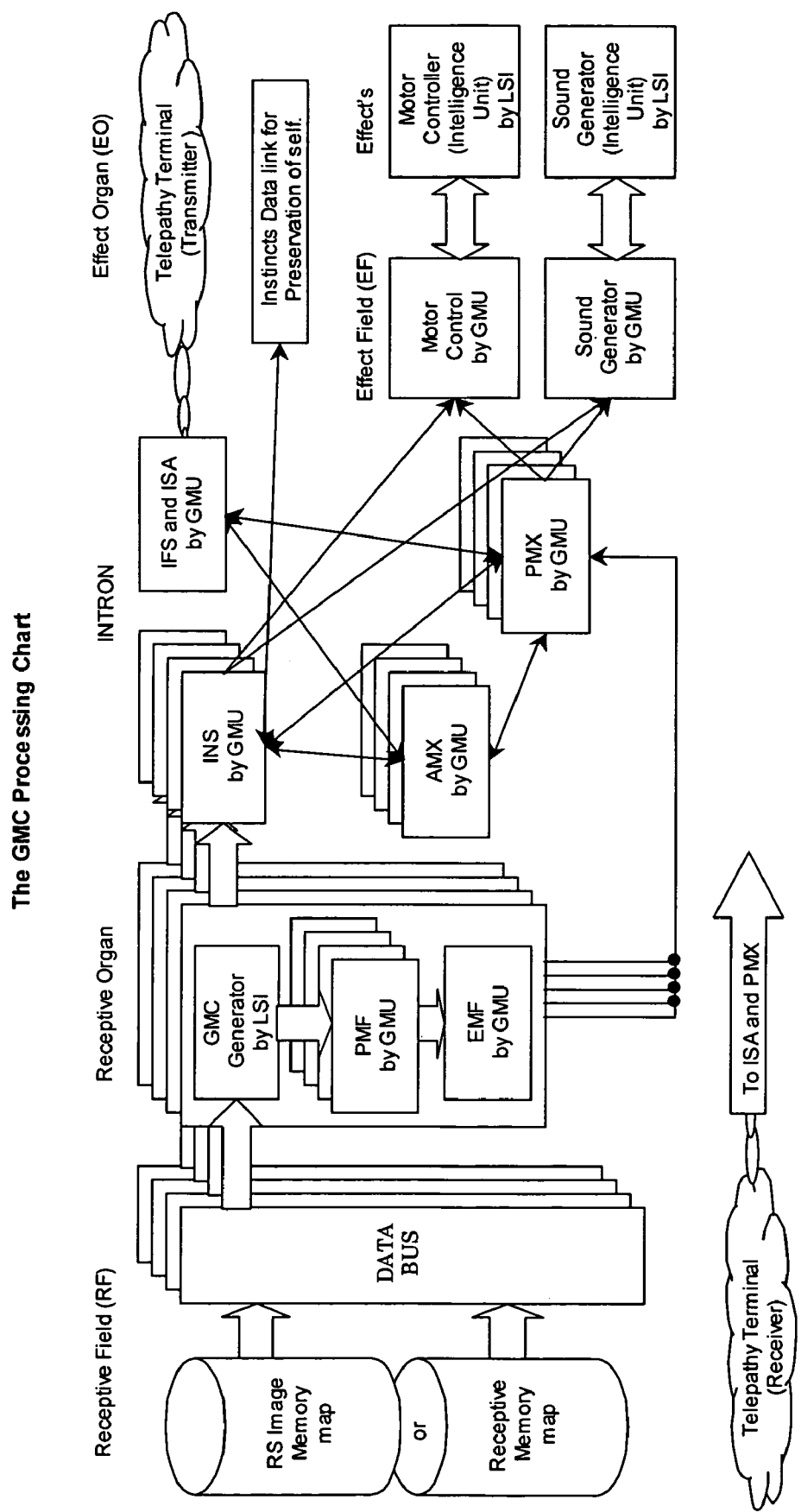
FIG. 22 is a hardware block diagram showing how multiple GMC control units are used to build an AL organism according to the SOM invention.

FIG. 22 explains the hardware composition of the central GMC processing in a computer hardware implementation of SOM.

Figure 23:
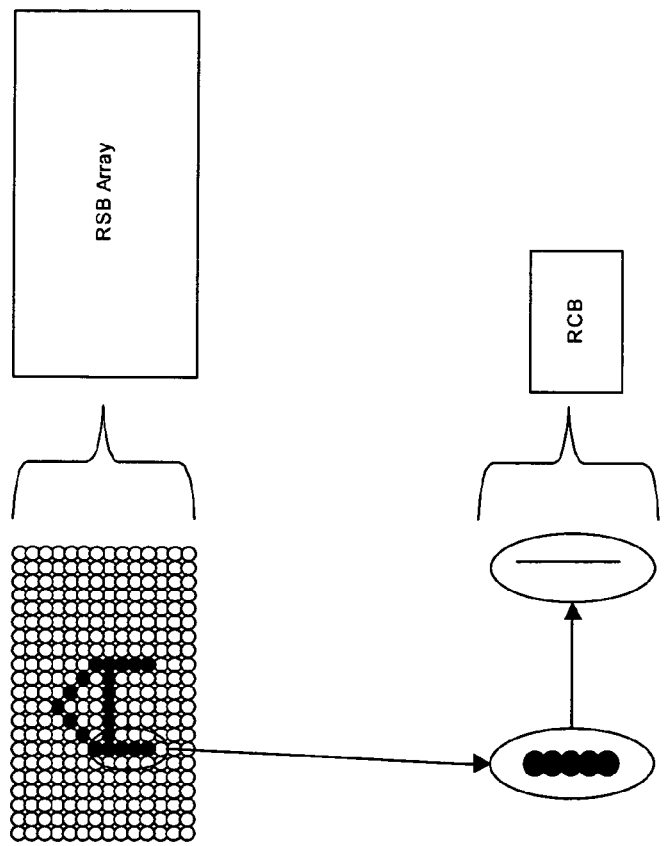
FIG. 23 is a diagram showing the RCB and RSB array or a vision organ and the related data tables an AL organism according to the SOM invention.

The RF changes the information from the sensors into RCB of FIG. 23, and outputs it to the Memory Map. The RCB is essentially the same as the RCI of the general SOM explanation above. The RSB is the interim phase of the RCB conversion process. The RS Image Memory Map is the object for two dimensions information, and the Receptive Memory Map is the object for time series. This process is performed by the hard ware. And this part is prepared for each sensor. FIG. 22 shows the Receptive Memory Map which is essentially the same with different sense organs (only the sensors change).

The RO constitutes the PMF and EMF which are implemented in the GMU. The GMC Generator LSI is a hardware implementation that generates the Geometric Connection Block (GMCB) of FIG. 24. This generated GMCB is used on all the GMU(s). The PMF will increase or decrease the number of linked GMU(s) according to the amount of information. As explained above each sensor has an RO.

The INTRON constitutes the IFS, ISA, INS, PMX, and AMX which are implemented by the GMU(s). At least two GMUs are used but, the INS, PMX, and AMX will dynamically increase or decrease the number of the GMU(s) according to the amount of information processed or the throughput required.

The EO processes the GMC of the INS by means of the EF. This is implemented as the Intelligence Unit LSI as hardware that processes the motions of the EO.

The Special Interface: This functions as a means of communication. Its interface can be the same as LAN. In that case the interface communicates by putting data on DTP of FIG. 26.

Telepathy Terminal: The Transmitter sends the image and the mental condition of one AL organism to other AL organisms. It also has a Receiver function to receive. It is identified as "Type: IFS" of the DTP of FIG. 26. This is the function required in order to take in 115 mood from expression. The transmissions occur in response to the status of the IFS. If the IFS value rapidly changes 30% or more, an immediate transmission occurs. If this situation continues, a transmission is made 60 times at intervals of one second. On the reception side, if a transmitted image is accepted by the ISA, the ISA receives the image by the Sense. However, if the ISA does not accept, the PMX takes in the IFS value and the Image that was received. Therefore, this is not a function that everyone can experience. Only an AL organism that has trained this organ may be able to receive. But since this function has a possibility of inhibiting the usual function, it is set in the place deeper than subconscious (e.g., if data discharged in large quantities, a receiving AL organism will be come aware of the situation of another AL organism.). Who has encountered what kind of situation when, where? This can be known from an "IFS value" and "the image used as its cause". Thereby, a Sixth Sense is realized—hence the name of Telepathy Terminal.

Instincts Data link for Preservation of self: This transfers the GMCB of the INS to the PMX of another AL organism in the process of Preservation of self. This is identified by "Type: GMCB" of the DTP of FIG. 26.

Data Table Contents: Structure of the table is a data array. Its data array becomes the element and constitutes the table. And the related tables are linked by a data chain. The link(s) is referred by pointer(s) and the selector that shows the GMU contained in the pointer.

Bit Format:

D0-D29: The GMU Local pointer (Bit length is 30 Bit Address)

D30-D39: The GMU Selector (Bit Length is 10 Bit Address)

This pointer format accesses address space of 1 G Bytes of the GMU, and makes it possible to install 1024 boards of GMU(s). However, since the IQ and OQ (Inside Queue and Outside Queue) of the Bus Net are the same as the LAN interface, Connection is not affected by addresses. The GMU selector and the address of the IQ and the OQ are divided for each OUTSIDE and INSIDE, and exist in each one.

The RS Block (RSB): The RSB of FIG. 23 is the intermediate link before changing into the straight line the image that appeared on the RS. Bit that shows the vertical and the horizontal link and, the value showing the frequency of Edge and, it consists of the threshold price (TP) of the standard for making an Edge.

The RC Linked Block (RCB): If an Edge is found by the RSB, it will be made into a straight line next. The RCB constitutes one element of its straight line. The straight line is expressed by two coordinates and the lower left is=(x, y)=(0, 0). And the angle of its straight line is unit two degrees and comes out, and holds beforehand, and, furthermore, the straight-line length is also held. To the last, link of the straight line that has that same angle and, link of the straight line with the same length is held. Furthermore, it has links of all the straight line sorted by angle. All processing's of the RSB and the RCB are performed by hard ware (See FIG. 22).

The Geometric Connection Block (GMCB): The GMCB of FIG. 24 is a data table that realizes the GMC. The RO use the GMC Generator LSI and make the GMCB of near form from the RCB using the GMCB that becomes origin. And then, software performs all processing's, such as detailed correction, change of connection, etc. The GMCB has the link of the Causal Relationship or the Related Phenomena and, it consists of the links of the Form Group that connects the relation of near forms. The Connective Intensive is the percentage showing closeness to the original GMCB. If the same event reoccurs at a regular interval (e.g., 1 hour), this is recognized by a counter which increments according to the unit of time and represents Connective Frequency. The chain of links that represents a form to the IFS, the ISA and the RCB is included. See FIGS. 15-19 for the varieties of the GMCs.

Figure 25:
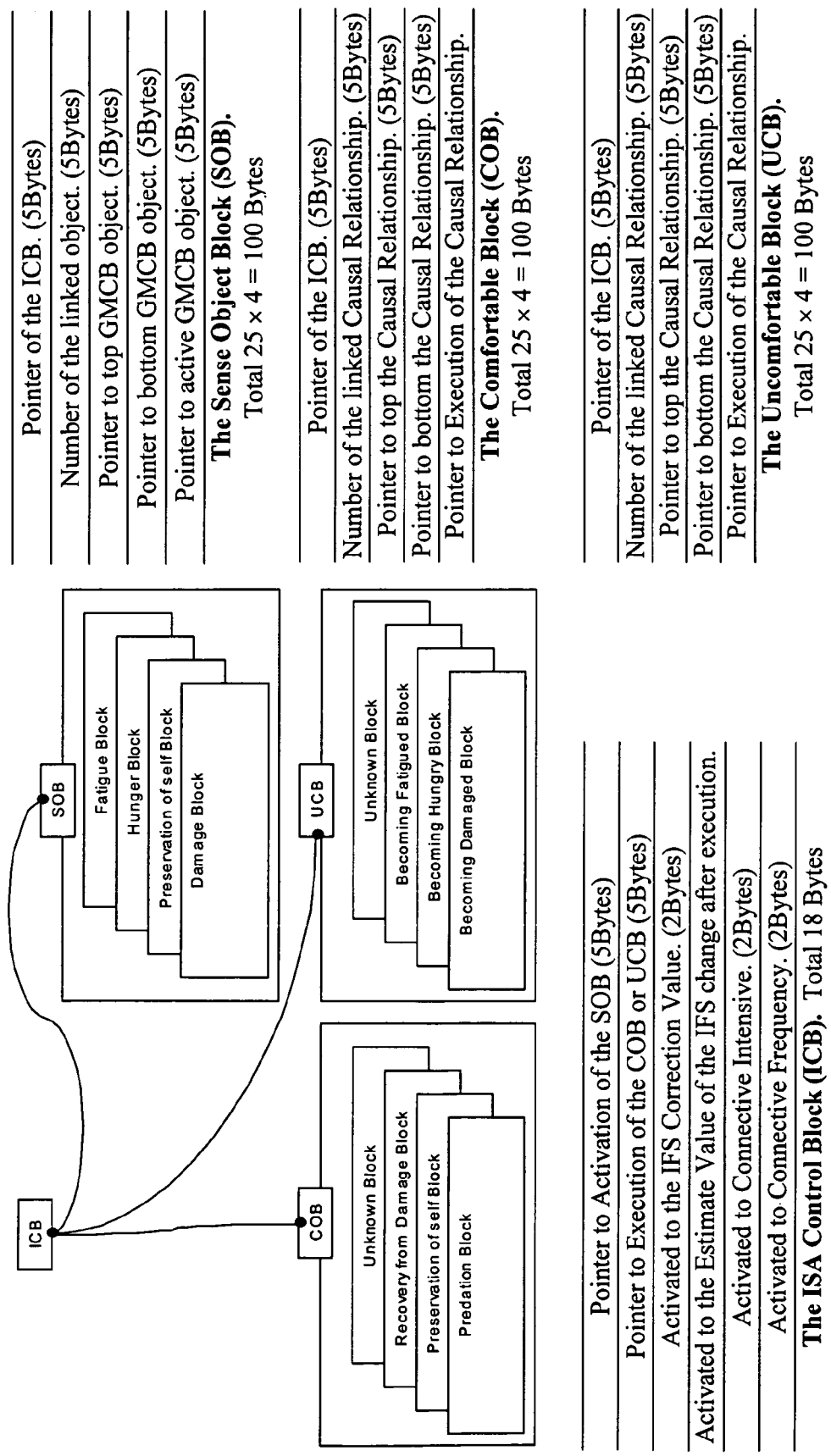
FIG. 25 shows a data table that can be used to implement the ISA

The ISA Control Block (ICB): The ICB(s) of FIG. 25 are the SOB that is a reason for action, and a table that manages the acts and the result.

The Sense Object Block (SOB): The SOB of FIG. 25 is a table pointing to the GMC that has the possibility of acceptance and also corresponds to the Causal Relationship of the cause of the act. The GMCs that may become the reason are linked all together. The sensed information is as follows.

1—Damage
2—Preservation of self
3—Hunger
4—Fatigue

Sensed Damage activates Recovery from Damage of the COB, and Becoming Damaged of the UCB activates Preservation of self of the COB. Predation of the COB activates Becoming Hungry and Becoming Fatigued of the UCB and Preservation of self and Recovery from Damage of the COB. The ICB chooses the most effective Causal Relationship of "The Estimate Value of the IFS change after execution" from "The Causal Relationship" by using "The IFS Correction Value". If the COB is activated with a classification in the COB of nothing, this phenomenon is added to the Unknown of the COB. As for this, the UCB is also the same.

The Comfortable Block (COB): The COB of FIG. 25 is the link that manages all the Comfortable relation. The Comfortable information is as follows.

1—Predation
2—Preservation of self
3—Recovery from Damage
4—The Unknown

A Causal Relationship exists for each classification.

The Uncomfortable Block (UCB): The UCB of FIG. 25 is the link that manages all the Uncomfortable relation. The Uncomfortable is information is as follows.

1—Becoming Damaged
2—Becoming Hungry
3—Becoming Fatigued

4—The Unknown

A Causal Relationship exists for each classification.

The COB and UCB of the ISA receive the situation of other AL organism(s)) that the Telepathy Terminal receives. In a development stage, communication of mood is performed through the Telepathy Terminal with AL organism(s) that is (are) present nearby. Communication of mood that does not need actual communication will be performed while repeating experiences. And this function gives the further judgmental standard to the ISA.

Data Transfer Packet (DTP): The DTP of FIG. 26 is the data packet used when communicating by the Telepathy Terminal (Transmitter and Receiver) and, the Instincts Data link for Preservation of self. The Body ID is the number uniquely assigned to the particular AL organism.

Figure 27:
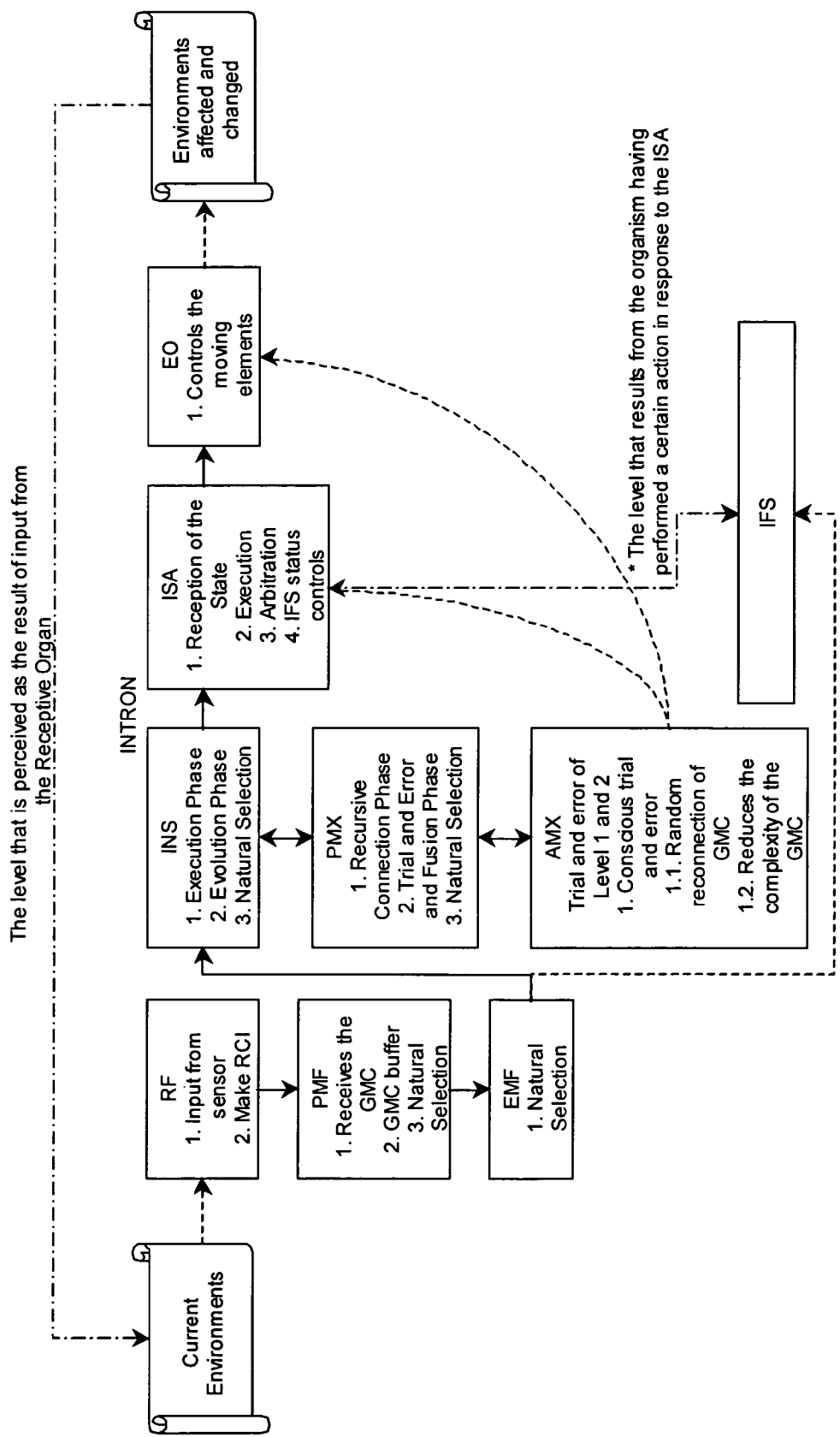
FIG. 27 is a flow chart model to explain the information flow within a SOM organism according to the present invention.

The concept of SOM has been explained above. One of skill in the art should appreciate all the fixed functioning of the RO, INS, PMX, AMX, and EO. FIG. 27 explains the fixed functions of each part and the corresponding information flow as has already been explained. The solid lines indicate the flows of the GMCs. The dashed lines indicate the affecting flow—that is, these lines indicate control rather than movement of GMCs. The dashed and dotted lines show affecting flow that results from an action. In the case of the connection between the IFS and INS, the control can be based on the estimated outcome of an action as opposed to the perceived outcome (line from affected environments to current environments). However, the character of the AL organism is included in the INS in the Life Code. The work that includes the character in the INS is not simple. Imagination is required to realize Artificial Life. I may have the knowledge of all the living things that are useful on the earth from the experiment and experience of 30 years. I believed that it is clear from the physical and mental experiment that used my brain and body. The algorithm of the INTRON (the INS, PMX, and AMX) was born from there. "Who has not learned by himself?", "Not taught by other persons", However, one may understand the theory while not knowing the reality, and the ability to do, etc. Furthermore, many of mysterious things, such as sixth sense, etc., were solved theoretically. Here, the realization of the method of fixed processing of SOM theory has been described. If SOM is implemented through electronics, a Cell Computing model must induce the best rationality. But if it is in the scale or situation that the human can't control, it is dangerous to use the Cell Computing model. Because such a world wide computer might be governed by the INTRON, such a computer should essentially not be used to create a SOM organism. The concept of growth and evolution of SOM life has a strong correspondence with growth and evolution of natural life. (In real living things the process of forming the multicellular body from cells is handled as information.). By the concept of SOM, as already explained, (1) information is inputted from environment; (2) The GMCs are increased; (3) Next natural selection inhibits this increase and forces the remaining GMCs to adapt to environment. Repetition of this process provides the growth morphology. The way the new growth morphology born out of this repetition process differs represents evolution morphology. Therefore, the theory of the growth morphology and evolution morphology of the information of the SOM is applying to the "growth morphology (body and group)" and "evolution morphology by generation of a new kind" of the real living thing. If you want to realize a SOM organism fully, you need a fusion of a living thing and electronics, and this should be realized by bionation. When humans enable bionation using the computer and SOM theory, a revolution will be brought to human evolution and man's weak points will be compensated. But that is an as yet unknown world.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

I claim:

1. An architecture for a self-organizing robotic system comprising:

an input system which comprises:

sensory organ means for receiving information from the environment and translating the information into an information pattern; and input receptive organ means for receiving each information pattern and converting each information pattern into a geometric connection;

an output system which comprises:

output receptive organ means for receiving geometric connections; and effect organ means for receiving the geometric connections from the output receptive organ means and for causing an effect in response;

a mind system for receiving geometric connections from the input system, processing the geometric connections and transmitting the geometric connections to the output system, which mind system comprises:

an advanced mind subsystem comprising an advanced neuro-matrix means for providing consciousness; and a primitive mind subsystem comprising:

a primitive neuro-matrix means for providing subconsciousness;

instinct means for storing causal relationships to provide a geometric connection output according to a geometric connection input;

instinct for survival means for prioritizing each input and output in terms of comfortable and uncomfortable; and instincts arbiter means for controlling future actions through promotion and inhibition of the output geometric connection according to status of the instinct for survival means;

wherein the output geometric connection observes conditions expressed by the instinct for survival means and the instincts arbiter means.

2. The system according to claim 1, wherein the input receptive organ means comprises a potential memory field means for receiving a receptive cell impulse from the sensory organ means and forming and temporarily storing a geometric connection from each receptive cell impulse, and an environmental adaptation memory field means for receiving and storing the geometric connections from the potential memory field means and interacting with the mind system to form causal relationships within the mind system.

3. The system according to claim 2, wherein the potential memory field means comprises a lower abstraction layer for receiving the receptive cell impulses and an upper abstraction layer for temporarily storing the geometric connections and for sending the geometric connections to the environmental adaptation memory field means.

4. The system according to claim 1, wherein the sensory organ means is one or more organs selected from the group consisting of sense organs, vision organs, auditory organs and motion recognition organs.

5. The system according to claim 4, wherein the motion recognition organ receives geometric connections from the potential memory field means of the vision organ, the sense organ and the auditory organ and compares successive geometric connections to detect serial time-related changes to create new geometric connections representing said changes.

6. The system according to claim 1, wherein the effect is a movement caused by a motor.

7. The system according to claim 1, further comprising receiver means for receiving data from other self organizing systems and transmitter means for transmitting data to other self organizing systems.

8. A geometric connection control unit for hardware implementation of a self-organizing robotic system comprising:
   a data bus;
   a central processing unit in communication with the data bus;
   a main memory in communication with the data bus;
   an output network in communication with the main memory;
   an inside queue network in communication with the data bus for servicing data requests from other geometric connection control units connected in parallel;
   an inside bank memory containing memory maps from other geometric connection control units connected in parallel;
   an inside memory window in communication with the data bus for addressing the main memory according to memory maps contained in the inside bank memory;
   an outside queue network in communication with the data bus for servicing data requests that do not come from other geometric connection control units connected in parallel;
   an outside bank memory containing memory maps that do not come from other geometric connection control units connected in parallel; and
   an outside memory window in communication with the data bus for addressing the main memory according to memory maps contained in the outside bank memory.

9. A self-organizing system comprising a plurality of the geometric connection control units according to claim 8 comprising:
   receptive field means for generating a receptive cell impulse in response to the environment;
   a receptive organ means comprising:
   geometric connection generator means for a creating geometric connection from the receptive cell impulse;
   potential memory field means comprising at least one geometric connection control unit for receiving the geometric connection;
   environmental adaptation memory means comprising at least one geometric connection control unit for receiving geometric connections from the potential memory field means;
   instinct means comprising at least one geometric connection control unit in data communication with the receptive organ means and in bidirectional communication with the advanced neuro-matrix means and the primitive neuro-matrix means;
   primitive neuro-matrix means comprising at least one geometric connection control unit for receiving geometric connections from the instinct means;
   advanced neuro-matrix means comprising at least one geometric connection control unit in bidirectional communication with the primitive neuro-matrix means;
   instincts arbiter means and instinct for survival means comprising at least one geometric connection control unit in communication with each other and with the advanced neuro-matrix means and the instinct means for inhibiting and promoting actions; and
   effect field means receiving communications from instincts arbiter means and the instinct for survival means and the advanced neuro-matrix means for producing an effect in response to the communications.

10. A method for creating a self-organizing robotic system comprising the steps of:
    providing an input process which comprises the steps of:
    a sensing step for receiving information from the environment and translating the information into an information pattern; and
    an input receptive step for receiving each information pattern and converting each information pattern into a geometric connection;
    an output process which comprises the steps of:
    an output receptive step for receiving geometric connections; and
    an effect step for receiving the geometric connections from the output receptive step and for causing an effect in response;
    a mind process for receiving geometric connections from the input step, processing the geometric connections and transmitting the geometric connections to the output step, which mind process comprises the steps of:
    an advanced mind subprocess comprising the steps of furnishing an advanced neuro-matrix means for providing consciousness; and
    a primitive mind subsystem comprising the steps of:
    furnishing a primitive neuro-matrix means for providing subconsciousness;
    furnishing an instinct means for storing causal relationships to output a geometric connection according to input of a geometric connection;
    furnishing an instinct for survival means for prioritizing each input and output in terms of comfortable and uncomfortable;
    furnishing an instincts arbiter means for controlling future actions through promotion and inhibition of the output geometric connection according to status of the instinct for survival means; and
    revising the output geometric connection based on a condition expressed by the instinct for survival means and a condition expressed by the instincts arbiter means.

11. The method according to claim 10, wherein the input receptive step further comprises a memorizing step for receiving a receptive cell impulse from the sensing step, forming and temporarily storing a geometric connection from each receptive cell impulse, and an environmental adaptation step for receiving and storing the geometric connections from the memorizing step and interacting with the mind process to form causal relationships.

12. The method according to claim 11, wherein the memorizing step comprises using a lower abstraction layer for receiving the receptive cell impulses and an upper abstraction layer for temporarily storing the geometric connections and for communicating the geometric connections with the environmental adaptation step.

13. The method according to claim 10, wherein the step uses one or more organs selected from the group consisting of sense organs, vision organs, auditory organs and motion recognition organs.

14. The method according to claim 13, wherein the motion recognition organ receives geometric connections from the vision organ, the sense organ and the auditory organ and compares successive geometric connections to detect serial time-related changes to create new geometric connections representing said changes.

15. The method according to claim 10, wherein the effect is a movement caused by a motor.

16. The method according to claim 10, further comprising a receiving step for receiving data from other self organizing systems and a transmitting step for transmitting data to other self organizing systems.

\* \* \* \* \*